United States Patent
Isaev et al.

(10) Patent No.: US 11,499,406 B2
(45) Date of Patent: Nov. 15, 2022

(54) METHOD FOR PREDICTING OF HYDRAULIC FRACTURING AND ASSOCIATED RISKS

(71) Applicant: SCHLUMBERGER TECHNOLOGY CORPORATION, Sugar Land, TX (US)

(72) Inventors: Vadim Ismailovich Isaev, Novosibirsk (RU); Dmitry Sergeevich Kuznetsov, Novosibirsk (RU); Ivan Vladmirovich Velikanov, Novosibirsk (RU); Denis Viktorovich Bannikov, Novosibirskaya Oblast (RU); Alexey Alexandrovich Tikhonov, Novosibirsk region (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 184 days.

(21) Appl. No.: 16/610,231

(22) PCT Filed: May 2, 2017

(86) PCT No.: PCT/RU2017/000282
§ 371 (c)(1),
(2) Date: Nov. 1, 2019

(87) PCT Pub. No.: WO2018/203765
PCT Pub. Date: Nov. 8, 2018

(65) Prior Publication Data
US 2020/0056460 A1 Feb. 20, 2020

(51) Int. Cl.
*G01V 99/00* (2009.01)
*E21B 43/267* (2006.01)
(Continued)

(52) U.S. Cl.
CPC ............ *E21B 43/267* (2013.01); *E21B 49/00* (2013.01); *G01V 99/005* (2013.01); *G06F 9/455* (2013.01);
(Continued)

(58) Field of Classification Search
CPC ........ E21B 43/267; E21B 49/00; G06F 30/00; G06F 9/455; G06F 2111/10; G01V 99/005; G01V 2210/646
(Continued)

(56) References Cited

U.S. PATENT DOCUMENTS 5,228,510 A * 7/1993 Jennings, Jr. ........... E21B 43/26
166/263
6,876,959 B1 4/2005 Peirce et al.
(Continued)

FOREIGN PATENT DOCUMENTS

WO 2008093264 A1 8/2008
WO 2016032489 A1 3/2016
WO 2016153953 A1 9/2016

OTHER PUBLICATIONS

Wang, HanYi. "Numerical modeling of non-planar hydraulic fracture propagation in brittle and ductile rocks using XFEM with cohesive zone method." Journal of Petroleum Science and Engineering 135 (2015). pp. 127-140. (Year: 2015).*
(Continued)

*Primary Examiner* — John E Johansen

(57) ABSTRACT

A method of predicting hydraulic fracturing and associated risks of hydraulic fracturing operation is proposed. The methods use the mathematical simulation which allow to predict the geometry of a hydraulic fracture and location of fluids, propping agents (proppant), fibers and other materials therein. Reconsidering the fracturing design allows to rem-
(Continued)

edy the possible risks (overflush, screen-out, bridging, gel contamination, temperature effects).

12 Claims, 11 Drawing Sheets

(51) Int. Cl.
  *E21B 49/00*    (2006.01)
  *G06F 9/455*    (2018.01)
  *G06F 30/00*    (2020.01)
  *G06F 111/10*    (2020.01)

(52) U.S. Cl.
  CPC ........ *G06F 30/00* (2020.01); *G01V 2210/646* (2013.01); *G06F 2111/10* (2020.01)

(58) Field of Classification Search
  USPC .......................................................... 703/10
  See application file for complete search history.

(56) References Cited

U.S. PATENT DOCUMENTS

| | | | |
|---|---|---|---|
| 8,412,500 | B2 | 4/2013 | Weng et al. |
| 8,855,988 | B2 * | 10/2014 | Strobel ............... G06F 30/20 703/10 |
| 8,898,046 | B2 | 11/2014 | Moos et al. |
| 2003/0205376 | A1 * | 11/2003 | Ayoub ............... E21B 49/00 166/254.2 |
| 2008/0183451 | A1 | 7/2008 | Weng et al. |
| 2012/0179444 | A1 | 7/2012 | Ganguly et al. |
| 2014/0305638 | A1 | 10/2014 | Kresse et al. |

OTHER PUBLICATIONS

Seright, R. S. "Gel placement in fractured systems." SPE Production & Facilities 10.04 (1995). pp. 241-248. (Year: 1995).*
Gillard, M., et al. "A new approach to generating fracture conductivity." SPE Annual Technical Conference and Exhibition. OnePetro, 2010. pp. 1-14. (Year: 2010).*
Shokanov, TalgatAdilhanovich, et al. "Subsurface Drilling Waste Injection: Real-Time Waste Domain Characterization Using Injection Monitoring and Pressure Interpretation." SPE Russian Oil and Gas Technical Conference and Exhibition. OnePetro, 2008. pp. 1-10. (Year: 2008).*
Adachi, José I., Emmanuel Detournay, and Anthony P. Peirce. "Analysis of the classical pseudo-3D model for hydraulic fracture with equilibrium height growth across stress barriers." International Journal of Rock Mechanics and Mining Sciences 47.4 (2010). pp. 625-639. (Year: 2010).*
International Preliminary Report on Patentability of International Patent Application No. PCT/RU2017/000282 dated Nov. 14, 2019; 7 pages.
Geertsma et al., "A Rapid Method of Predicting Width and Extent of Hydraulically Induced Fractures", SPE 2458, Journal of Petroleum Technology, Dec. 1969, pp. 1571-1581.
Perkins et al., "Widths of Hydraulic Fractures", SPE 89, Journal of Petroleum Technology, Sep. 1961, pp. 937-949.
Adachi et al., "Computer Simulation of hydraulic fractures", Int. J of Rock Mechanics & Mining Sciences, vol. 44, 2007, pp. 739-757.
Alekseenko et al., "3-D Modeling of Fracture Initiation from Perforated Non-Cemented Wellbore", SPE 151585, Society of Petroleum Engineers, Feb. 2012, 16 pages.
Mack et al., "Mechanics of Hydraulic Fracturing", In: Reservoir Stimulation, pp. 6-16-6-23, 3d edition, John Willey, 2000.
Boronin et al., "Two-Continua Model of Suspension Flow in a Hydraulic Fracture", Doklady Physics, 2010, vol. 55, No. 4, pp. 199-202.
Settari, "General Model of Fluid Flow (Leakoff) From Fractures Induced in Injection Operations", SPE-18197-MS, Society of Petroleum Engineers, Oct. 1988, pp. 165-173.
International Search Report issued in International Patent Appl. No. PCT/RU2017000282 dated Dec. 14, 2017; 3 pages (with English translation).
Written Opinion issued in International Patent Appl. No. PCT/RU2017000282 dated Dec. 14, 2017; 4 pages.
Russian Search Report issued in Russian Patent Application No. 2019134378 dated Aug. 24, 2020; 2 pages.

* cited by examiner

METHOD FOR PREDICTING OF HYDRAULIC FRACTURING AND ASSOCIATED RISKS

BACKGROUND

The disclosure relates to the oil and gas industry and can be applied for stimulation of the subterranean reservoir using hydraulic fracturing of the reservoir, in particular, when using mathematical modeling for predicting the geometry of a hydraulic fracture and location of fluids, propping agents (proppant), fibers and other materials therein.

Hydraulic fracturing is a recognized method of increasing well productivity. The ongoing development of new hydraulic fracturing technologies demands the development of more precise tools of hydraulic fracturing prediction. For example, in HiWAY™ technology (trademark of Schlumberger) proppant is placed in a fracture in a heterogeneous way; such placement in the form of pillars is achieved by injection of proppant-laden slurry (proppant pulse) and clean fluid (clean pulse) into the well. The passage of successive hydraulic fracturing fluid pulses through perforation clusters creates pillars with a high proppant concentration in the hydraulic fracture. Such pillars act as propping areas, and proppant-free areas form a network of channels in the hydraulic fracture, increasing hydraulic fracture conductivity and the effect of stimulation of the oil bearing reservoir. In this case, calculation (simulation) of location of propped and unpropped areas in the fracture (inhomogeneous placement of proppant) allows us to predict the future production rate of the oil bearing reservoir after hydraulic fracturing stimulation. This disclosure is a method of hydraulic fracturing prediction which extends the possibilities of the existing pseudo-three-dimensional (P3D) approach for HiWAY technology and other modern methods of hydraulic fracturing assuring inhomogeneous distribution of conductivity inside the hydraulic fracture.

An overview of the existing methods of hydraulic fracturing prediction is given below. A more detailed overview is also available in the paper of J. Adachi et al. Computer Simulation of Hydraulic Fractures, Int. J. of Rock Mechanics and Mining Sciences, 44 (2007) 739-757.

At present, the oil and gas industry hydraulic fracturing is designed using mathematical modeling of this complex and dynamic process. If the pressure in the well exceeds the formation breakdown pressure of the reservoir, propagation of the fracture with simultaneous filtration of a part of the fluid in the porous reservoir takes place. Although stimulation operations using hydraulic fracturing are quite common, due to complicating factors there is still a risk of performing hydraulic fracturing operations which do not meet the target goals of increasing the inflow of oil and gas fluid in the wellbore through the hydraulic fracture. Using the method of trial and error to identify the risks is too expensive when performing hydraulic fracturing operations.

During hydraulic fracturing operations (injection of fluid into the wellbore at a pressure exceeding the reservoir fracturing pressure) mass transport of hydraulic fracturing material (proppant), as well as heat transfer (usually the temperature of hydraulic fracturing fluid is lower than that of the reservoir) take place in the hydraulic fracture. The dynamic model for the hydraulic fracturing process requires coupling of the models which describe these interconnected processes in the hydraulic fracture: propagation of the fracture in the reservoir (geomechanical model) and transport of hydraulic fracturing materials (hydrodynamic model of transport in the fracture space of a fluid medium containing carrier (viscous) fluid, proppant particles, fibers and different additives). The carrier fluid must have a sufficiently high viscosity in order to ensure efficient transport of proppant (hydraulic fracturing material—or "propping agent") deep down into the fracture. Usually, the carrier fluid is a non-Newtonian fluid in the form of a water soluble polymer (thickening polymer) or an ionically cross-linked water soluble polymer (cross-linked gel). The rheology of proppant slurry in gel (non-Newtonian fluid) is described by the power law. The two submodels (the geomechanical one for the fracture and the hydrodynamic one for the transport of hydraulic fracturing materials in the fracture space) require coupling via one of physical parameters in order to ensure the consistency of the solution.

Below you will find publications describing hydraulic fracturing models of different complexity.

PKN Models [T. K. Perkins, L. R. Kern. Widths of Hydraulic Fractures. Journal of Petroleum Technology, 13 (1961), 9, SPE-89-A] ℏ KGD [A Rapid Method of Predicting Width and Extent of Hydraulically Induced Fractures, 21 (1969), 12, SPE-2458-PA].

Fracture Propagation.

Height is assumed to be constant; deformation of rock occurs in one plane of the hydraulic fracture.

Transport (Transfer) of Hydraulic Fracturing Materials.

The model of transfer of material inside the fracture is not calculated.

Radial Model.

Fracture Propagation.

Axisymmetric deformation of rock relative to the well axis (mechanically isotropic rock) is assumed.

Transport of Hydraulic Fracturing Materials.

The model of transfer of material inside the fracture is not calculated (uniform hydraulic fracturing fluid).

Pseudo-three-dimensional models (for example, Pseudo3D from FracCADE™, trademark of Schlumberger).

Fracture Propagation.

A flat vertical fracture of variable height, presented in the form of cells similar to the PKN model. Widely used in the oil and gas industry. It is applicable when the fracture half-length significantly exceeds its height.

Transport of Hydraulic Fracturing Materials.

It is calculated using the one-dimensional model, having the same resolution as the fracture propagation submodel.

Planar 3D (for example, U.S. Pat. No. 6,876,959, GOHFER™, Stim-Lab and Marathon Oil Company trademark, TerraFrac™, TerraTek trademark, StimPlan™, NSI trademark).

Fracture Propagation.

A flat vertical fracture of variable height with any length to height ratio. It is more accurate than the pseudo-three-dimensional models in the case when the reservoir consists of several layers with significantly varying properties: minimum horizontal compressive stress, Young's modulus and others.

Transport of Hydraulic Fracturing Materials.

It is calculated using the two-dimensional submodel, having the same resolution as the fracture propagation submodel (one dense grid for two models).

The Planar 3D model requires more time for calculation than the pseudo-three-dimensional models and is limited to field application (not applicable for prompt risk assessment during hydraulic fracturing).

Three-dimensional models (for example, SPE-151585-PA)

Fracture Propagation.

The curved trajectory of the fracture with arbitrary directions of propagation, none of which are in the same plane.

Transport of Hydraulic Fracturing Materials.

The model of transfer of material inside the fracture is not calculated.

Hydraulic fracturing models in naturally fractured reservoirs (for example, UFM' model, trademark of Schlumberger, U.S. Pat. No. 8,412,500, international application WO 2008093264).

Fracture Propagation.

Based on the pseudo-three-dimensional approach and the submodel of interaction with natural fractures. A hydraulic fracture that was created meets an existing natural fracture and subsequent development of the fracture network is described by a specially built geomechanical model (geomechanics for intersecting fractures).

Transport of Hydraulic Fracturing Materials.

Calculated using only the one-dimensional model.

The existing hydraulic fracturing models do not allow us to predict the actual two-dimensional distribution of hydraulic fracturing materials (proppant, fibers, gel concentration). This disclosure is aimed at remedying these drawbacks, as well as predicting the risks associated with hydraulic fracturing operations and selecting a hydraulic fracturing schedule and well operations that reduce the risks of ineffective hydraulic fracturing.

SUMMARY

This disclosure is aimed at developing a method of hydraulic fracturing prediction taking into account the mass transport and heat transfer processes. The disclosure contains the following operations:

1. The pseudo-three-dimensional submodel of fracture propagation (known from the prior art). For the purpose of performing calculations, the data on the mechanical properties of the reservoir and the data on the rheological parameters of the hydraulic fracturing fluid (slurry), which are considered constant in each cell of the grid used, are entered in the fracture propagation submodels. The grid of the fracture propagation submodel is coarser than that of the hydraulic fracturing material transport submodel. The cell of the fracture propagation submodel is obtained by merging the smaller cells of the hydraulic fracturing material transport submodel.

2. The two-dimensional submodel of hydraulic fracturing material transport, leakoffs and heat exchange with rock, having a higher space and time resolution as compared to the fracture propagation model from clause 1.

3. The method of coupling of submodels from clauses 1 and 2. It assures equality of hydrodynamic resistance for the grid cells of the fracture propagation model for cases of: (a) constant rheological parameters used in clause 1 and (b) distribution of rheological parameters calculated using the hydraulic fracturing material transport submodel in clause 2.

This disclosure extends the possibilities of the existing pseudo-three-dimensional approach to hydraulic fracturing prediction. First of all, the prediction method allows us to calculate the distribution of hydraulic fracturing materials in the fracture with higher resolution than in the existing models. In this case, the calculation time is consistent and sufficient for rapid hydraulic fracturing prediction in the field. Second, the coupling algorithm from clause 3 makes it possible to take into account the impact of distributions of hydraulic fracturing materials and temperature, calculated with high resolution, on fracture propagation.

A method of hydraulic fracturing is also proposed.

A method of predicting well productivity is also proposed.

This disclosure is also aimed at predicting risks when performing hydraulic fracturing: the phenomenon of overflush of hydraulic fracturing fluid, contamination of the fracture with water soluble gelling polymer and partial plugging of the fracture with proppant (bridging). Simulation using the coupled submodels allows us to select well operations that reduce the risks of ineffective hydraulic fracturing.

The method also allows us to predict hydraulic fracturing parameters for channel hydraulic fracturing (heterogeneous placement of proppant in the hydraulic fracture with channels formation).

GLOSSARY

Figure 1:
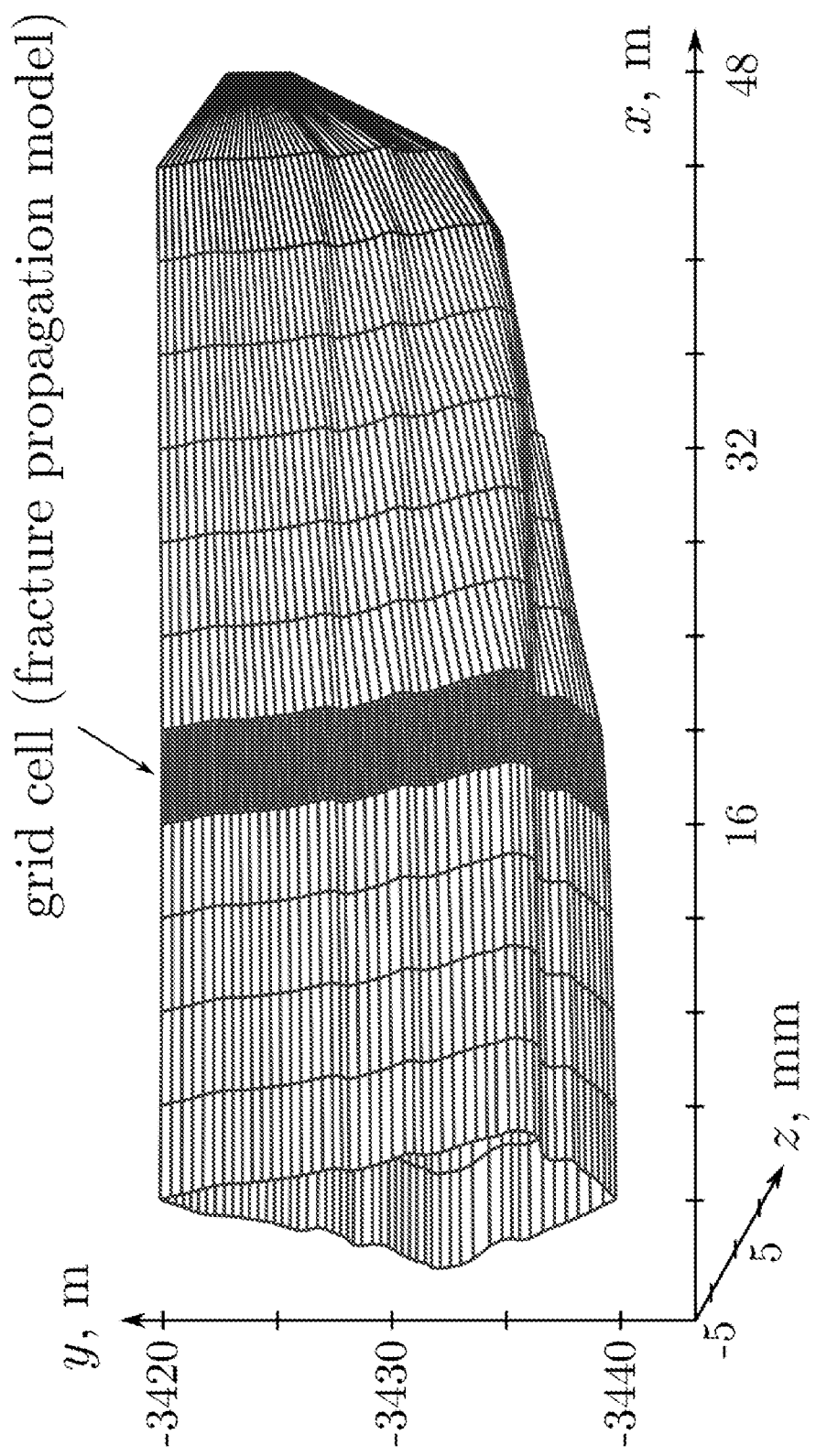
FIG. 1. A scheme of a hydraulic fracture with geometry calculated using the pseudo-three-dimensional fracture propagation submodel (one half wing of the hydraulic fracture is shown; simulation of the second wing is identical).

Hydraulic fracturing is a well stimulation technique consisting of high pressure injection of fracturing fluid into a wellbore to create cracks in the deep-rock formations through which hydrocarbons will flow.

Hydraulic fracturing materials are carrier fluids, propping agents, fibers, and also additives (for example, friction reducers, breaking agents, cross-linking agents, stabilizers, surfactants).

Proppant is a propping agent (durable graded sand or its analogues). The proppant dimensions allow us to inject proppant slurry within the fracturing fluid into the wellbore, and then, into the developed fracture through perforations. The diameter of proppant is smaller than the hydraulic fracture width, which ensures proppant is transported deep into the fracture.

Proppant properties are diameter (US mesh), mean diameter and specific density. They allow us to simulate the transport of proppant particles deep into the fracture, as well as proppant settling.

Propped area of the fracture is an area propped by proppant. Permeability of the propped area is higher than that of the surrounding rock.

Distribution of hydraulic fracture conductivity is a function that assumes the values of local fracture conductivity at each point (x, y).

Local fracture conductivity is the product of fracture width after its closure and permeability of the proppant pack and channels formed as a result of hydraulic fracturing. The parameters of average permeability of the proppant pack [m²] are measured in a laboratory in accordance with the standard ISO 13503-5.

The risks of hydraulic fracturing are factors whose impact reduces total hydraulic conductivity of the hydraulic fracture and the efficiency of reservoir stimulation to a level below the target level.

Partial plugging or bridging (risk of plugging) is when proppant (proppant and fiber mixture) stops moving in a narrow fracture due to interaction of its particles, its interaction with fluid and the fracture walls. During hydraulic fracturing the occurrence of bridging results in a sharp increase in bottomhole pressure, and indicates that there is a risk of not performing the hydraulic fracturing operations according to schedule. When simulating the flow of hydraulic fracturing fluid (proppant slurry in carrier fluid), bridging results in an increase in hydrodynamic resistance to the flow and a halt in proppant transport in the direction of the flow (zero velocity of proppant in the simulated flow of particles).

Resolution (of the model, calculation) is the number of grid cells per length unit (spatial resolution), number of time steps per time unit (time resolution).

Fluid Properties:

Rheological parameters are the parameters K and n in the power law fluid rheology (power law fluids), according to which $$\tau = K(\partial u/\partial \xi)^n, \mu = K(\partial u/\partial \xi)^{n-1},$$

where $\tau$ is the shear stress, K is the consistency index, n is the behaviour index, $\mu$ is the apparent fluid viscosity, $\partial u/\partial \xi$ is the shear rate (velocity gradient along axis $\xi$, perpendicular to shear velocity of fluid layers). The parameters K and n of carrier fluids are measured in a laboratory in accordance with the standards ISO 13503-1 and API 13M.

The parameters of the fluid filtration rate:

The leakoff coefficient $C_L$, m/s$^{0.5}$ and the spurt loss coefficient $S_p$, m³/²—are the parameters of the Carter model of fluid leakoff into reservoir, according to which $$\frac{V_L}{A_L} = 2C_L\sqrt{t} + S_p,$$

where $V_L$ is the volume of fluid leakoff into reservoir during time t—(the time elapsed from the start of leakoff), $A_L$ is the surface area through which the leakoff takes place. The leakoff model is described in detail in the book of M. J. Economides, K. G. Nolte, Reservoir Stimulation, 3$^{rd}$ Edition, p. 2-17.

Type of carrier fluid rheology:

A Newtonian fluid is a power law fluid, where n=1. For such fluid the rheological parameters include only viscosity $\mu$=K. The shear stress is defined as $\tau$=K $\partial u/\partial \xi$.

A non-Newtonian fluid is a fluid which viscosity depends on the shear rate. In the case of power law fluid rheology, it is a fluid for which n #1.

The reservoir mechanical properties are a set of parameters describing the rock in the hydraulic fracturing area and allowing us to evaluate the hydraulic fracture geometry. In addition to conventional strength characteristics of rock (Young's modulus [GPa], Poisson's ratio), the following parameters should be taken into account when simulating a fracture:

The fracture toughness $K_{IC}$ (or the critical stress intensity factor), kPa·m$^{1/2}$, is a mechanical parameter specifying the threshold of mechanical stress at which further propagation of the fracture occurs in hard rock.

Closure stress (MPa)—if the pressure inside the fracture is below this threshold, closure (healing) of the fracture takes place. In this case the hydraulic fracturing process comes to a halt.

DETAILED DESCRIPTION

In one or several embodiments according to this disclosure the methods can be aimed at hydraulic fracturing prediction and can include the following operations:

Hydraulic Fracturing Design

Hydraulic fracturing design includes the steps listed below.

1. Obtaining the mechanical and conductive properties of the reservoir on the basis of log data and other measuring tools.

2. Collecting information about the well: trajectory, completion (place of casing string perforations) and other parameters.

3. Obtaining data on laboratory measurements of the properties of hydraulic fracturing materials: fluids (rheological parameters, density), proppant properties (density and sizes), fibers (for example, impact on the proppant settling rate).

4. Selection of the hydraulic fracturing injection schedule: selection of the injection material (viscous fluids, proppant and additives), flow rate and volume of injected hydraulic fracturing materials, proppant concentration, fibers and additives concentration, maximum pressure during hydraulic fracturing (exceeds formation breakdown pressure).

5. Prediction of the hydraulic fracturing operation: simulation of fracture propagation and the transport of hydraulic fracturing materials in it; calculation of fracture conductivity distribution.

6. Output of simulation data at the time of completion of the hydraulic fracturing schedule (local proppant concentration, concentration of residual gel, distribution of conductivity for the propped fracture).

7. In addition, a prediction of well productivity for the distribution of hydraulic fracture conductivity obtained in clauses 5-6 is made. If the required well parameters are achieved, then go to clause 8 or to clause 4 and change the hydraulic fracturing injection schedule (change the volumes of hydraulic fracturing materials or their proportions).

8. Hydraulic fracturing on the basis of the selected hydraulic fracturing schedule (as per clause 4).

To predict well productivity (step 7) for the target fracture conductivity distribution (the reservoir was stimulated by hydraulic fracturing), reservoir simulators ECLIPSE" and INTERSECT, trademarks of Schlumberger, can be used. These software allow us to work with complex models of the hydraulic fracture and predict the oil and gas fluid production rate in terms of time for a pay zone.

Hydraulic Fracturing Prediction

This section contains a description of the proposed method of hydraulic fracturing prediction from clause 5 of the hydraulic fracturing design process.

In the hydraulic fracturing model injection time is broken into successive steps $t_1, t_2, \ldots, t_N$, where $t_1$ is the start of injection of hydraulic fracturing materials into the well, $t_N$ is the final time point considered. Calculation is carried out successively for steps from $t_k$ to $t_{k+1}$, $k=1, \ldots, N-1$. At each time step it is necessary to carry out the steps listed below.

1. Fracture Propagation Submodel

At this step calculation of fracture propagation is carried out using the pseudo-three-dimensional model. In this model the fracture region is covered by a one-dimensional computational grid, shown in FIG. 1. The constant rheological parameters of slurry, obtained for the previous time step $t=t_k$, are specified in each cell of this grid. At the first time step the properties of fluids injected into the well first are taken.

2. Hydraulic Fracturing Material Transport Submodel

In this submodel the fracture region is covered by a two-dimensional computational grid which has a higher resolution than that of the grid from clause 1. In the cells of this two-dimensional grid the components of the velocity in the fracture are calculated for all hydraulic fracturing materials (proppant, fibers, carrier fluids, as well as additives). Then, the transport of materials and heat energy balance are calculated at the step from $t_k$ to $t_{k+1}$.

3. Coupling of the Fracture Propagation Submodel and the Hydraulic Fracturing Material Transport Submodel.

During coupling, a calculation of the constant effective rheological parameters $K^*$ and $n^*$ of slurry, providing the same hydrodynamic resistance of the cell as the distributions $K(x, y)$ and $n(x, y)$, obtained in the transport submodel in clause 2 at $t=t_{k+1}$, is carried out in each cell of the grid from clause 1.

The sections with a detailed description of each step of clauses 1-3 are presented below.

Fracture Propagation Submodel

To describe fracture propagation, the pseudo-three-dimensional (P3D) model, into which a one-dimensional cell grid, shown in FIG. 1, is used. At any point in time each cell has a rectangular shape in the fracture plane with sides parallel to the vertical and horizontal axes of the fracture orientation. The position of the cells changes at each time step. For this reason, this grid is called moving.

To perform calculations at each time step, it is necessary to specify the slurry rheological parameter values in all the cells of the grid (the parameters K and n). In this case, the parameters inside each cell are considered constant.

A full description of the fracture propagation model is presented in chapter 6, in the book of M. J. Economides, K. G. Nolte, Reservoir Stimulation, pp. 6-16-6-23, 3d edition, John Willey, 2000.

Hydraulic Fracturing Material Transport Submodel

To calculate the distribution of pressure in the fracture and the velocity of transport of slurry during hydraulic fracturing, equations of the lubrication and transport theory are used. For example, in the case of Newtonian fluid and proppant they are as follows:

$$\frac{\partial w}{\partial t} + div[w u_f] + 2 v_l = 0,$$

$$u_f = -\frac{w^2}{12 \mu_s(c)}(\nabla p - \rho g),$$

$$u_p = u_f + u_s,$$

$$\frac{\partial (wc)}{\partial t} + div[w u_p c] = 0,$$

where w is the fracture width;

$u_f$ and $u_f \hbar u_p$ are the mass-averaged and crosswise of the fracture velocity fields of fluid and proppant, respectively;

$v_l$ is the velocity of fluid leakoffs into reservoir;

$\mu_s (c)$ is the apparent viscosity of slurry depending on the proppant concentration c;

g is free-fall acceleration.

This model is described in detail, for example, in the publication [S. Boronin, A. Osiptsov, Two-Continua Model of Suspension Flow in a Hydraulic Fracture, Doklady Physics, 2010, Vol. 55, No. 4]. This disclosure proposes to use this approach in the case of an arbitrary amount of hydraulic fracturing materials (proppant, fibers, additives).

Figure 2:
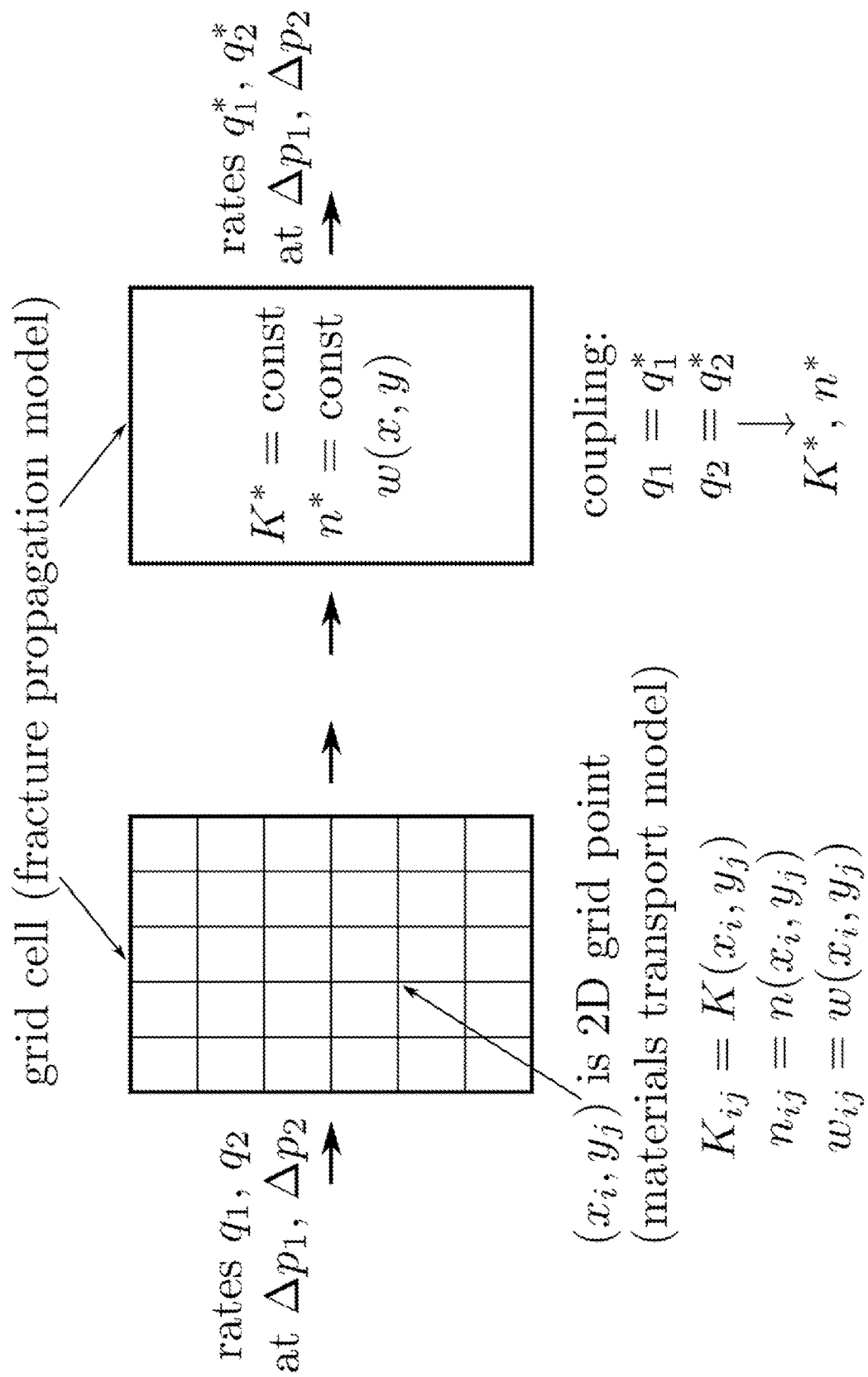
FIG. 2. Coupling of the fracture propagation submodel and the hydraulic fracturing material transport submodel.

At the end of each time step the transport submodel allows us to calculate the concentrations of all hydraulic fracturing materials at the grid nodes (FIG. 2, the diagram to the left), the latter having higher resolution as compared to the coarse grid (for calculation of fracture propagation, FIG. 2, the diagram to the right). Then, material concentrations are used to calculate the distribution of the slurry rheological parameters (power law rheology). As a result, non-uniform distribution of these rheological properties is usually obtained in each cell of the grid of the fracture propagation submodel.

Coupling of the Fracture Propagation Submodel and the Hydraulic Fracturing Material Transport Submodel The problem of coupling of the fracture propagation submodel and the hydraulic fracturing material transport submodel is to obtain equal hydrodynamic resistance of the cell of the fracture propagation model for the cases: (a) of constant effective parameters $K^*$ and $n^*$ and (b) distribution of $K(x, y)$ and $n(x, y)$, calculated using the hydraulic fracturing material transport submodel. The equivalent set of simulation cells for two said submodels is shown in FIG. 2 (to the left—for the hydraulic fracturing material transport submodel, to the right—for the fracture propagation submodel).

According to the embodiment of the disclosure, the large cell for the fracture propagation submodel is divided into small grid cells, where the hydraulic fracturing material transport submodel is calculated (FIG. 2). This allows us to simplify and accelerate the simulation of hydraulic fracture geometry without loss of accuracy in our calculations.

The coupling task is resolved using the method where the generalized parameters $K^*$ and $n^*$ are calculated, and is described below. Let's consider it using the example of one rectangular cell $C=\{x_l \leq x \leq x_r, y_b \leq y \leq y_t\}$, where the coordinates $x_l, x_r, y_t, y_b$ specify the position of its left, right, top and bottom borders, respectively.

1. To calculate the flows through cell C, occurring as a result of drops in pressure $\Delta p_1 = 0.9 \Delta p$ and $\Delta p_2 = 1.1 \Delta p$ between the left and right borders, respectively. In this case, utilize the distribution of rheological parameters $K(x, y)$ and $n(x, y)$, calculated using the transport submodel, and the known distribution of fracture thickness $w(x, y)$. Here $\Delta p$ is the drop in pressure between the left and right borders of cell C, obtained in the transport submodel at the final time step.

2. Calculate the total flows $q_1$ and $q_1$ in the direction of axis x through cell C, corresponding to drops in pressures $\Delta p_1$ and $\Delta p_2$ from clause 1.

3. Calculate these values K* and n*, so that for the flow through cell C with these constant rheological parameters and thickness w(x, y) from clause 1, the total flows correspond to $q_1$ and $q_2$ at drops in pressure $\Delta p_1$ and $\Delta p_2$, respectively. This condition provides two equations for determination of sought constants K* and n* (for the large cell C).

In one or several embodiments according to this disclosure, the methods can be aimed at predicting well productivity after hydraulic fracturing and can include: inputting data of hydraulic fracturing schedule; inputting data for the submodel of hydraulic fracturing propagation in the reservoir; inputting data for the submodel of hydraulic fracturing material transport in the hydraulic fracture; simulating hydraulic fracturing using the hydraulic fracturing propagation submodel and the hydraulic fracturing material transport submodel, wherein coupling of submodels is carried out as per hydrodynamic resistance for the simulation cells; and outputting simulation data at the time of completion of the hydraulic fracturing schedule and/or fracture closure. After obtaining the prediction of hydraulic fracture conductivity distribution, the prediction of hydraulic fracturing well productivity in terms of time (in the form of cumulative productivity or current productivity of the well, intersecting the reservoir) is obtained, using the programme for simulation of inflow from the pay reservoir.

In one or several embodiments according to this disclosure the methods can be aimed at predicting different situations related to the risk of hydraulic fracturing.

Hence, in some embodiments the methods can be implemented to predict overflush in the hydraulic fracture and can include: inputting data of hydraulic fracturing schedule; inputting data for the submodel of hydraulic fracturing propagation in the reservoir; inputting data for the submodel of hydraulic fracturing material transport in the hydraulic fracture; simulating hydraulic fracturing using the hydraulic fracturing propagation submodel and the hydraulic fracturing material transport submodel, wherein coupling of submodels is carried out as per hydrodynamic resistance for the simulation cells; simulating hydraulic fracturing for the step of injecting a flush fluid slug in the hydraulic fracture region; and outputting simulation data at the time of completion of the hydraulic fracturing schedule and/or fracture closure. At last, obtaining data on hydraulic fracture conductivity near the perforations. If necessary, the hydraulic fracturing schedule is changed in order to reduce the effect of overflush of proppant when pumping a batch for removal of proppant from the wellbore (displacement fluid).

In some embodiments the methods can be implemented to predict pulse injection of proppant and can include: inputting data of hydraulic fracturing schedule; inputting data for the submodel of hydraulic fracturing propagation in the reservoir; inputting data for the submodel of hydraulic fracturing material transport in the hydraulic fracture; simulating hydraulic fracturing using the hydraulic fracturing propagation submodel and the hydraulic fracturing material transport submodel, wherein coupling of submodels is carried out as per hydrodynamic resistance for the simulation cells; simulating hydraulic fracturing for sequential injection of pulses of clean fluid and proppant-laden fluid; and outputting simulation data at the time of completion of the hydraulic fracturing schedule and/or fracture closure. The output data are used to obtain and evaluate hydraulic fracture conductivity data.

In some embodiments the methods can be implemented to predict the contamination of the hydraulic fracture with gelling polymer and can include: inputting data of hydraulic fracturing schedule; inputting data for the submodel of hydraulic fracturing propagation in the reservoir; inputting data for the submodel of hydraulic fracturing material transport in the hydraulic fracture; simulating hydraulic fracturing using the hydraulic fracturing propagation submodel and the hydraulic fracturing material transport submodel, wherein coupling of submodels is carried out as per hydrodynamic resistance for the simulation cells; simulating hydraulic fracturing for sequential injection of pulses of clean fluid and proppant-laden fluid; and outputting simulation data at the time of completion of the hydraulic fracturing schedule and/or fracture closure. Next, areas with a high concentration of gelling polymer (i.e. areas of fracture contamination) are determined. At high risks of contamination the hydraulic fracturing schedule (concentration of the gelling agent in hydraulic fracturing fluid) is changed.

In some embodiments the methods can be implemented to predict hydraulic fracture plugging, and can include: inputting data of hydraulic fracturing schedule; inputting data for the submodel of hydraulic fracturing propagation in the reservoir; inputting data for the submodel of hydraulic fracturing material transport in the hydraulic fracture; simulating hydraulic fracturing using the hydraulic fracturing propagation submodel and the hydraulic fracturing material transport submodel, wherein coupling of submodels is carried out as per hydrodynamic resistance for the simulation cells; and outputting simulation data at the time of completion of the hydraulic fracturing schedule and/or fracture closure. Next, areas of low conductivity inside the hydraulic fracture and at the inlet to the hydraulic fracture are determined. If necessary, the hydraulic fracturing schedule is changed.

EXAMPLES

This section contains examples demonstrating possibilities of the proposed disclosure (hydraulic fracturing simulation) as compared to the available prior art. For example, in comparison with the model combining the pseudo-three-dimensional (P3D) fracture growth submodel and the one-dimensional (1D) hydraulic fracturing material transport submodel. Hereinafter, this comparative option of hydraulic fracturing simulation is referred to as the "available prior art".

Example 1. Prediction of Overflush by Flush Fluid in the Hydraulic Fracture

Case

To flush the well after hydraulic fracturing, a low-viscosity clean fluid is injected in it. When performing the final step of hydraulic fracturing, there is a risk of overflush—penetration in the near-wellbore area of flush fluid and proppant washout from this area. This results in proppant flowback from the areas adjoining the perforations. Excessive overflush leads to the presence of propped areas in the hydraulic fracture. They reduce the conductive properties of the fracture, which, in its turn, reduce well productivity. On the other hand, insufficient flushing of the well results in an excessive amount of proppant, which remained outside the hydraulic fracture, and requires additional well operations and causes problems with the downhole equipment placement. To assess the risks related to overflush (or "overdisplacement"), hydraulic fracturing design requires prediction of the actual placement of proppant after flushing with clean fluid at high pressure (exceeding formation breakdown pressure) and identification of unpropped areas inside the hydraulic fracture.

Solution

Simulations were made using the proposed disclosure. As an example, the fracture propagating in the reservoirs, which are described in Table 1, was considered. The pumping parameters and the properties of hydraulic fracturing materials are presented in Tables 2, 3, 4. Leakoff into reservoir is equal to zero (assumption that the reservoir has low permeability). Hydraulic fracturing fluid (non-Newtonian fluid) is injected into the vertical well through the perforation interval from 4091 m to 4092 m (true vertical depth). Initiation of the hydraulic fracture occurs in zone 2. Flushing at the final step of hydraulic fracturing was carried out with water-based fluid (low-viscosity Newtonian fluid).

TABLE 1

Reservoir zones mechanical properties

| Reservoir zones | Reservoir zone top depth, m | Thickness, m | Young's modulus, GPa | Poisson's ratio | Fracture toughness, kPa · m$^{1/2}$ | Closure stress, MPa |
|---|---|---|---|---|---|---|
| 1 | 4078 | 4 | 80 | 0.30 | 1100 | 86 |
| 2/perforations | 4082 | 18 | 80 | 0.24 | 770 | 55 |
| 3 | 4100 | 20 | 80 | 0.32 | 1100 | 90 |

TABLE 2

Fluid properties

| Fluid | K, Pa · s$^n$ | n | Fluid type |
|---|---|---|---|
| fluid 1 | 5.9 | 0.46 | non-Newtonian |
| fluid 2 (flush fluid) | 0.001 | 1 | Newtonian |

TABLE 3

Proppant properties

| Size (US mesh) | Average diameter, mm | Specific density | Average permeability of proppant pack, m$^2$ |
|---|---|---|---|
| 20/40 | 0.65 | 3.03 | 2.7E−10 |

TABLE 4

Pumping parameters (hydraulic fracturing schedule)

| Step | Fluid | Flow rate, m$^3$/min | Injection volume, m$^3$ | Proppant concentration, kg/m$^3$ |
|---|---|---|---|---|
| 1 | fluid 1 | 2.7 | 48 | 0 |
| 2 | fluid 1 + proppant (hydraulic fracturing fluid) | 2.7 | 48 | 600 |
| 3 | fluid 2 (flush fluid) | 2.7 | 4.8 | 0 |

Figure 3:
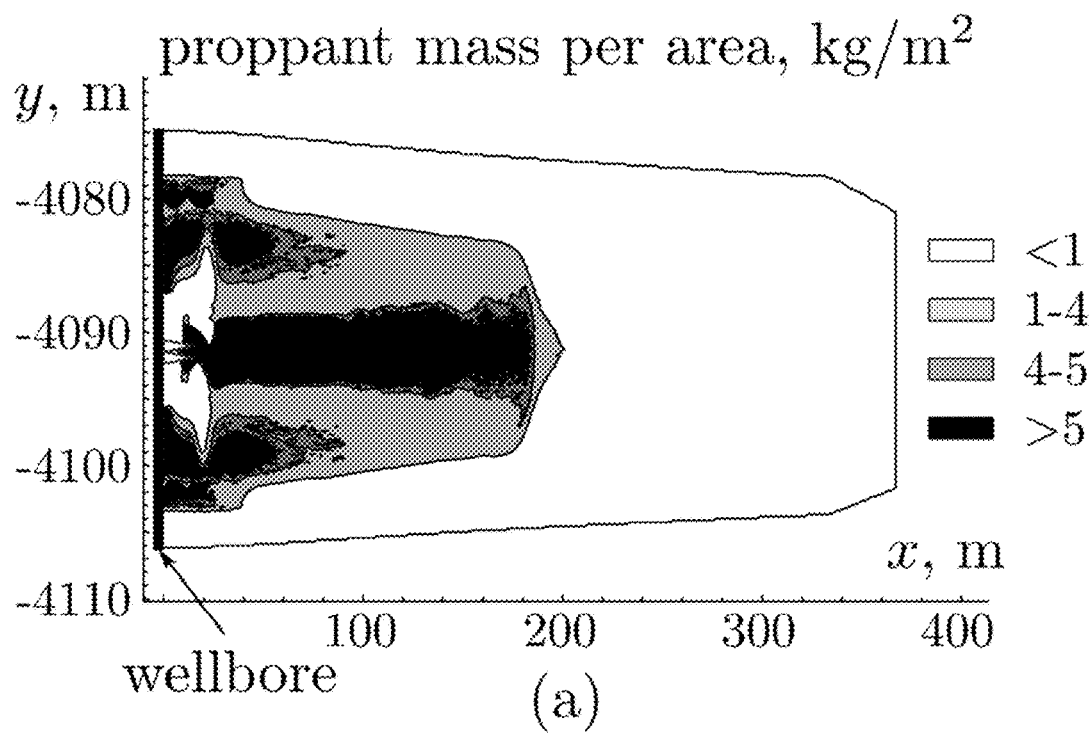
FIG. 3. Simulation of flush fluid injection into the fracture using the two-dimensional hydraulic fracturing material transport submodel: proppant concentration (a) and fracture conductivity (b). The phenomenon of overflush of proppant near the perforations is shown.
Figure 3:
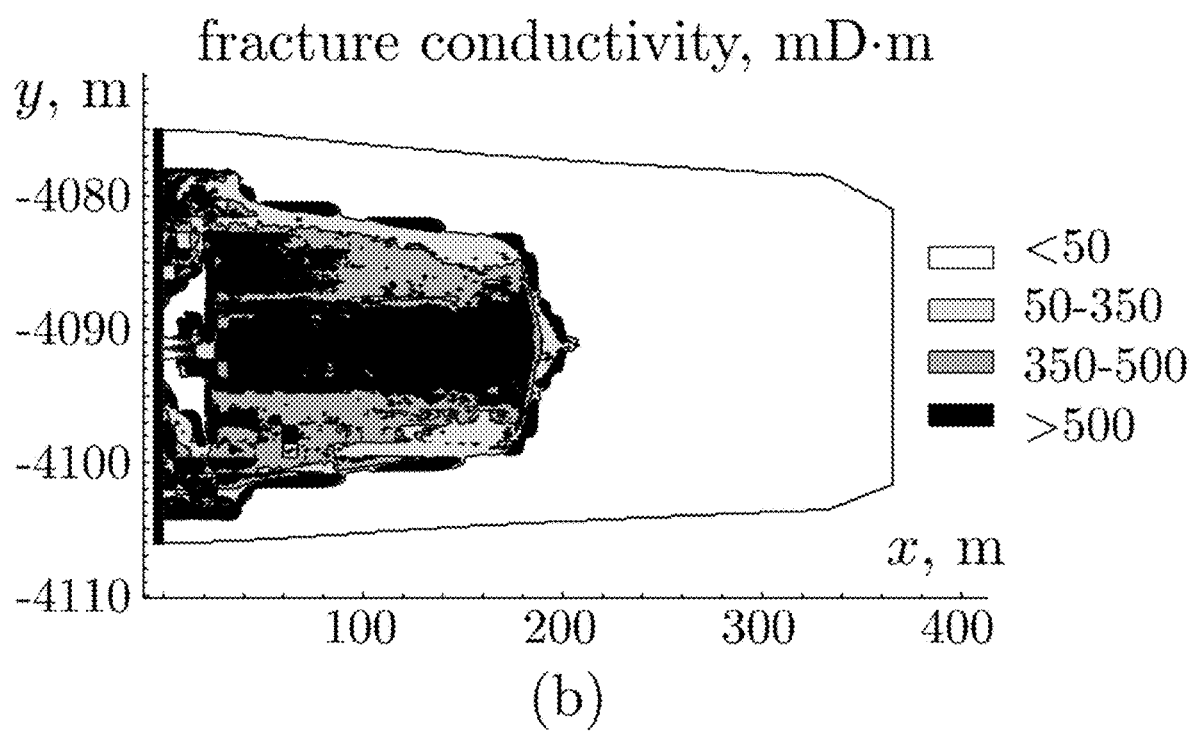
Figure 4:
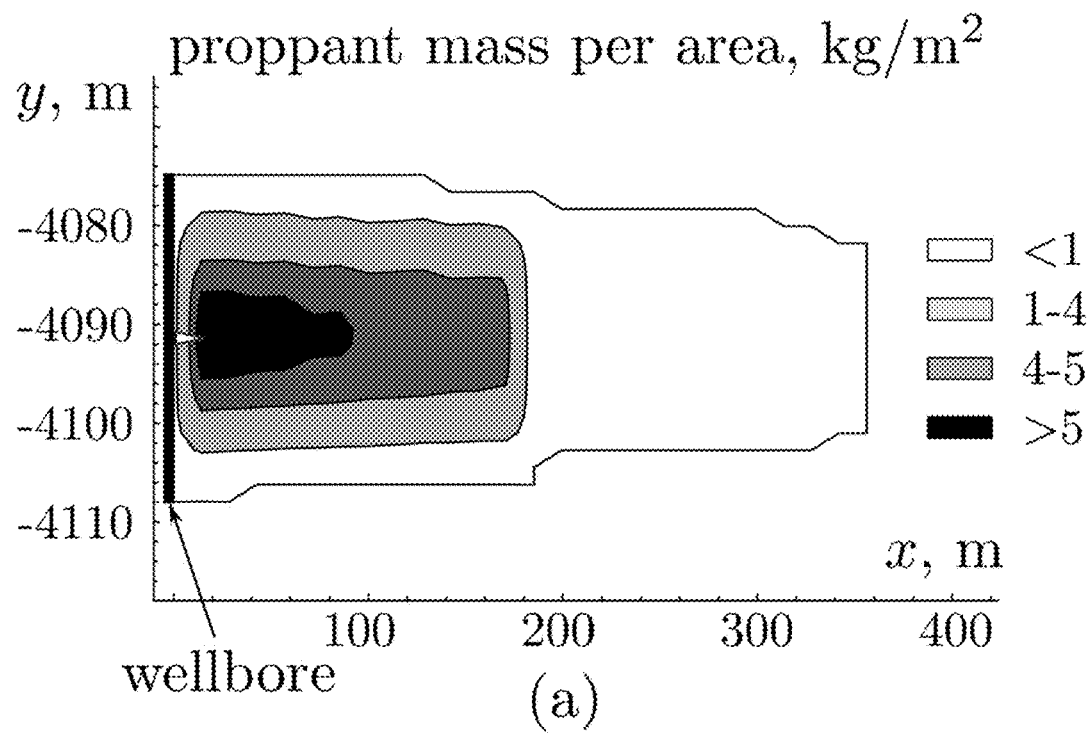
FIG. 4. Simulation of flush fluid injection into the fracture using the one-dimensional hydraulic fracturing material transport submodel: proppant concentration (a) and fracture conductivity (b).
Figure 4:
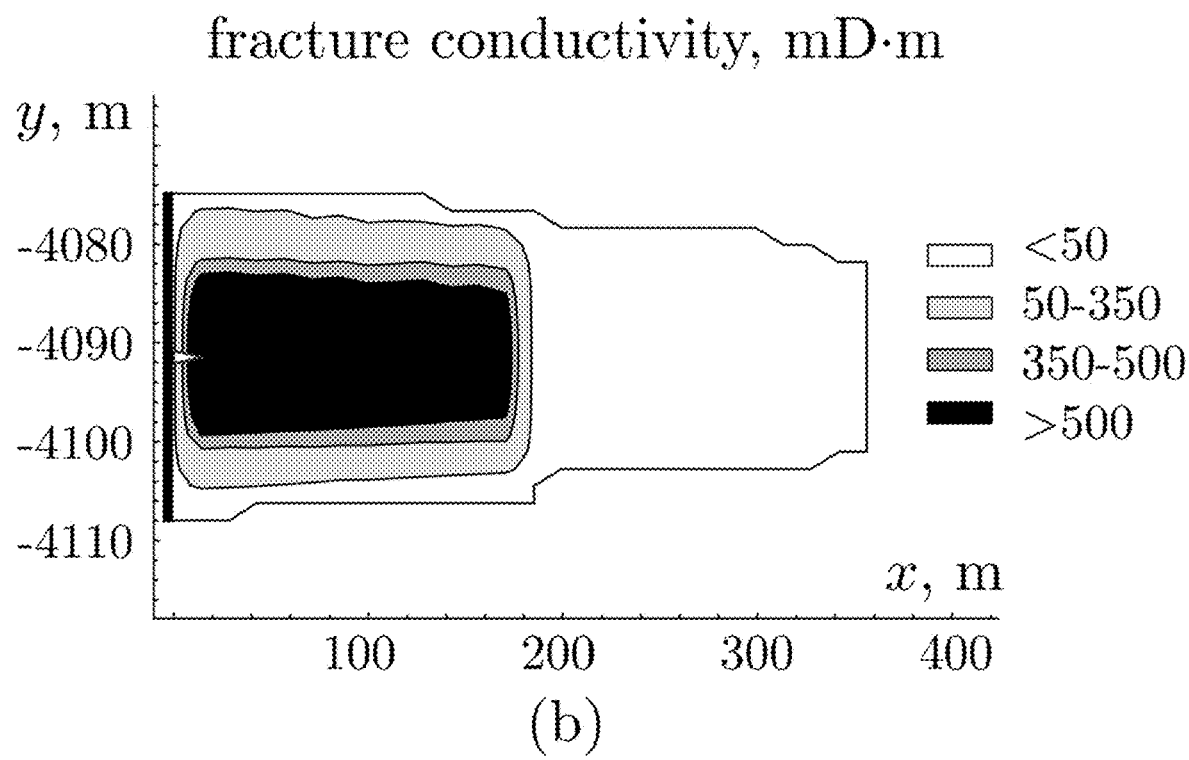

FIG. 3 contains the calculation results for the final step of hydraulic fracturing—simulation of fluid flow on a space grid with the number of cells 257*257. The results of simulation of injection of flush fluid 2 (water-based fluid at the final step of hydraulic fracturing) are presented in the form of two characteristics: proppant concentration (FIG. 3a) and fracture conductivity (FIG. 3b). The phenomenon of overflush of proppant near the perforations is shown (it creates the risk of local closure of the fracture walls in the areas deficient in proppant). The perforations (as well as the "perforation cluster", a group of perforations) are shown as small triangles between the wellbore and the hydraulic fracture. In FIG. 3 we can see that during injection of fluid 2 (flush fluid) a flow with Saffman-Taylor instability (irregularity of flow of two fluids due to high viscosity contrast) is formed near the perforations. This irregularity of flow affects the final distribution (washout) of proppant and the conductivity of the proppant pack near the perforation cluster. In the one-dimensional hydraulic fracturing material transport model this effect is not taken into account (see FIG. 4) and the risk of local reduction of fracture conductivity near the perforations is not simulated and not taken into account.

Conclusion

The proposed disclosure allows us to predict the distribution of fracture conductivity after overflush more accurately (as compared to the pseudo-three-dimensional model and the one-dimensional hydraulic fracturing material transport model). On the basis of this prediction, the operator selects (for example, decreases) the amount of flush fluid and repeats the prediction steps for a new hydraulic fracturing schedule, reducing the risk of appearance of unpropped areas in the fracture. On the other hand, small-scale overflush of proppant near the perforation cluster provides advantages for subsequent well operations (no remains of the proppant in the wellbore).

Example 2. Simulation of Pulse Injection of Proppant (Heterogeneous Proppant Placement in a Fracture)

Case

It is necessary to predict the distribution of hydraulic fracturing materials and fracture conductivity during injection alternating between small proppant pulses and pulses of clean fluid.

Solution

Calculations were made using the proposed disclosure. As an example, the fracture, obtained after completion of the hydraulic fracturing schedule, described in Table 5, was considered. The rest of the fluid and proppant parameters conform to those described above in example 1.

TABLE 5

| | | Flow rate, | Injection volume, | Proppant concentration, | No. of | Pulse duration, s | |
|---|---|---|---|---|---|---|---|
| Step | Fluid | m³/min | m³ | kg/m³ | pulses | proppant | clean |
| 1 | fluid 1 | 2.7 | 48 | 0 | 1 | 0 | 1060 |
| 2 | fluid 1 + proppant | 2.7 | 52 | 600 | 28 | 20 | 20 |

Pumping parameters (hydraulic fracturing schedule)

Figure 5:
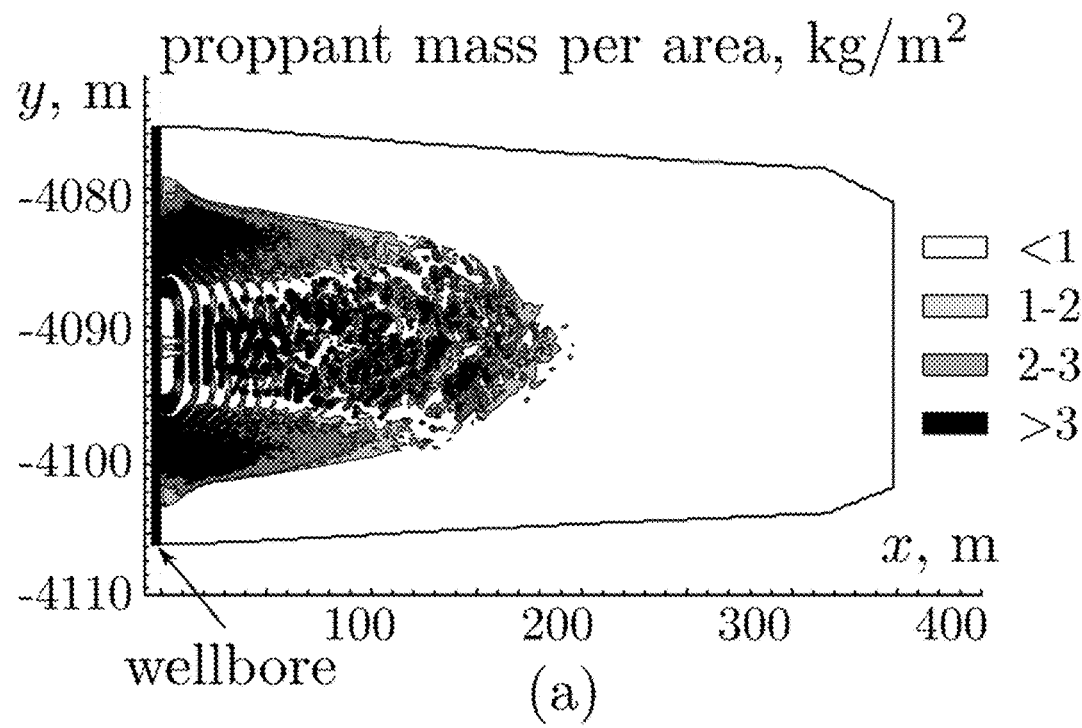
FIG. 5. Simulation of pulse injection of proppant in the fracture using the two-dimensional hydraulic fracturing material transport submodel: proppant concentration (a) and fracture conductivity (b).
Figure 5:
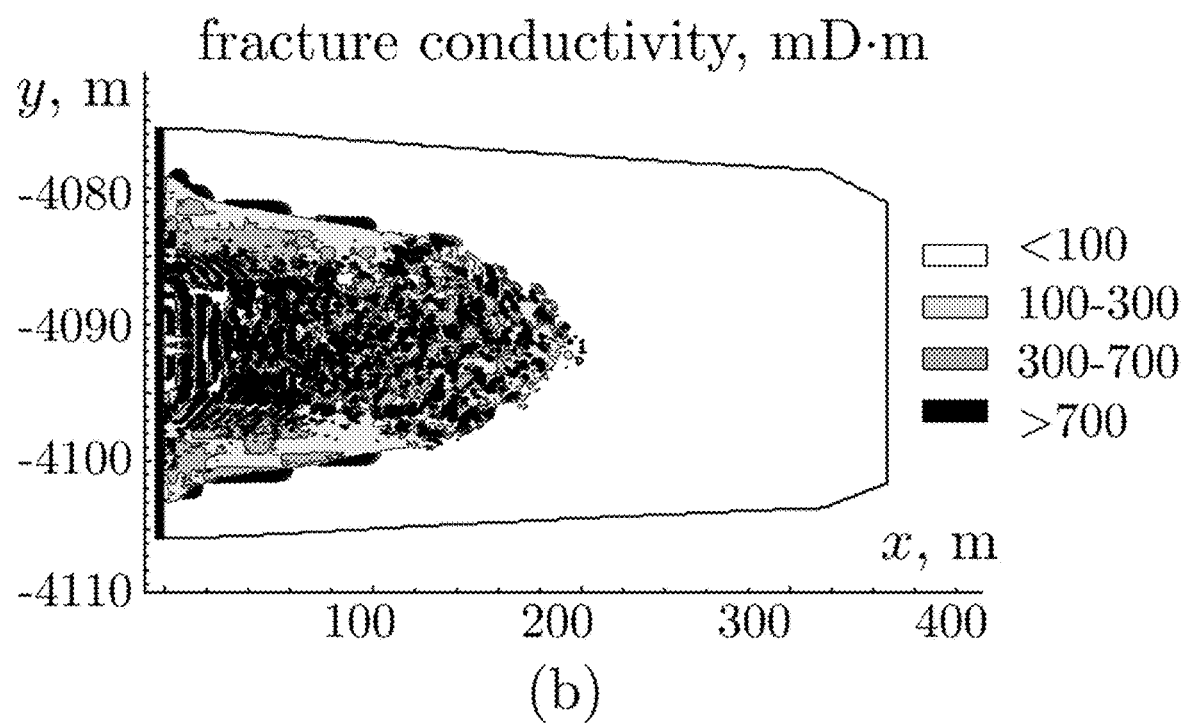
Figure 6:
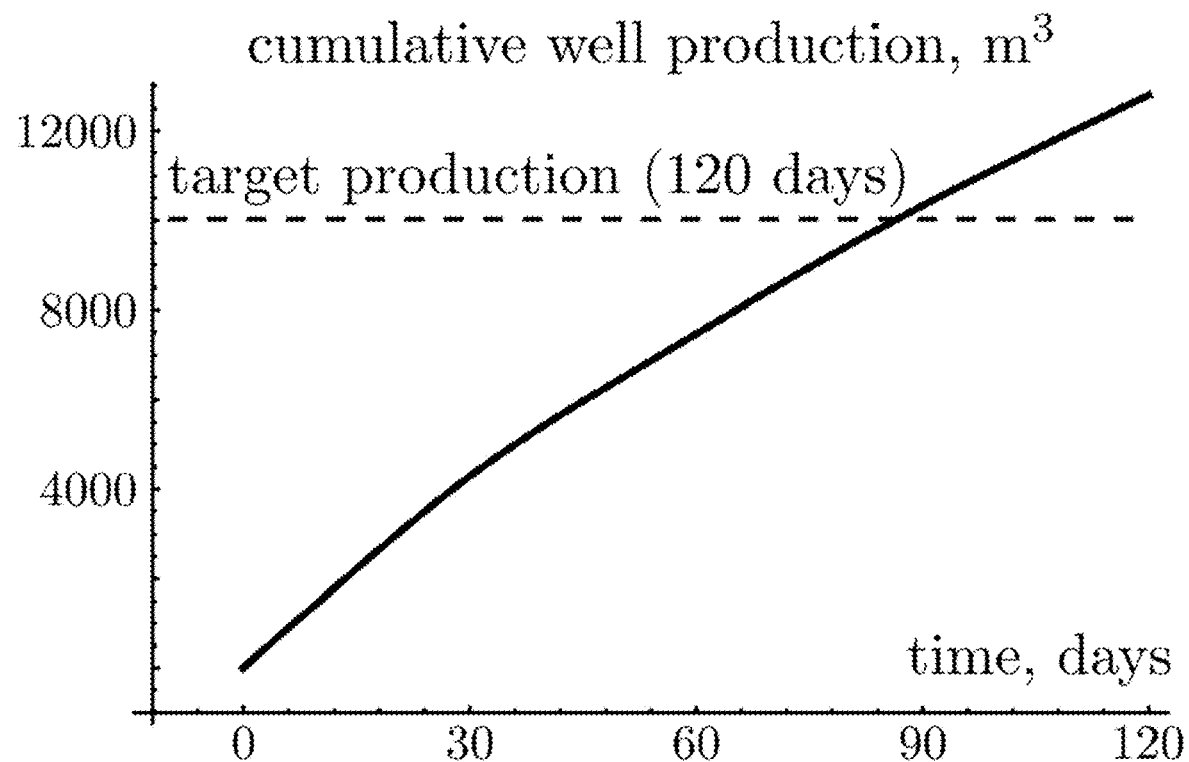
FIG. 6. Cumulative production prediction after hydraulic fracturing carried out according to FIG. 5.

FIG. 5 shows the calculation results obtained using the one-dimensional hydraulic fracturing material transport model. The graphs show heterogeneous (uneven) distribution of proppant, obtained through multi-pulse injection (28 dirty-and-clean pulses). FIG. 5 shows that hydraulic fracture conductivity depends on the final distribution of proppant and free channels (the channels are characterized by low proppant concentration around the proppant aggregates). FIG. 6 shows prediction for the cumulative well productivity for the case of obtained distribution of fracture conductivity. The dashed line shows the target productivity level for a period of 120 days. We can see that the selected injection schedule allows us to achieve this level, i.e., this hydraulic fracturing option achieves the objective set.

If the productivity level has not been achieved, the operator reconsiders the pumping parameters or the casing perforation strategy for increasing productivity.

Conclusion

The proposed disclosure allows us to predict heterogeneous distribution of fracture conductivity and hydraulic fracturing materials during pulse injection of proppant. The obtained data allow us to predict the well productivity. On the basis of this prediction, the operator makes a decision, for example, to select wells where hydraulic fracturing with pulse injection achieves the target productivity rate.

Example 3. Simulation of Contamination of the Fracture with Gelling Agent

Case

The main purpose of hydraulic fracturing is to increase well productivity. This is achieved by creating a fracture in the rock which increases the contact area between the well and the reservoir and ensures the transport of hydrocarbons to perforations. During hydraulic fracturing a low concentration of the gelling agent reduces the transport capabilities of the carrier fluid, while excessive concentration of the gelling agent results in rock contamination and filter cake formation. The choice between these extreme conditions has been found using simulation of gel distribution at the time of completion of hydraulic fracturing (prediction of contamination areas). The hydraulic fracturing technology implies the use of substances which reduce stimulation efficiency, producing the low conductive filter cake on the fracture walls and plugging the space between proppant particles (proppant pack contamination). Prediction of fracture contamination is needed to select the gel concentration, the position of perforations and, possibly, the fracture cleaning strategy, which would ensure the desired increase in well productivity.

The main tool used for predicting fracture contamination is mathematical simulation of gel settling as a result of filtration of hydraulic fracturing fluid in the reservoir. However, gel distribution, obtained using one-dimensional (simplified) model for the flow in the fracture, cannot be the basis for selecting the hydraulic fracturing fluid injection schedule.

Solution

Simulations were made using the proposed disclosure. As an example, the fracture propagating in the reservoirs, which are described in Table 6, was considered. The fluid and proppant properties are given in Tables 7, 8. Table 9 contains the pumping parameters. Fluid is injected into the vertical well through the perforation interval from 2720 m to 2725 m (true vertical depth). Fluid leakoff into reservoir were described with the Carter leakoff model, presented, for example, in the article of A. Settari, General Model of Fluid Flow (Leakoff) From Fractures Induced in Injection Operations, SPE-18197-MS. The following parameters for hydraulic fracturing were used in the model: leakoff coefficient and spurt loss coefficient.

TABLE 6

Reservoir mechanical properties

| Reservoir zones | Reservoir zone top depth, m | Thickness, m | Young's modulus, GPa | Poisson's ratio | Fracture toughness, kPa·m^{1/2} | Closure stress, MPa |
|---|---|---|---|---|---|---|
| 1 | 2700 | 10 | 23.32 | 0.28 | 1099 | 100 |
| 2 | 2710 | 5 | 34.54 | 0.18 | 1319 | 40 |
| 3 | 2715 | 5 | 34.54 | 0.18 | 1319 | 80 |
| 4/perforations | 2720 | 5 | 34.54 | 0.18 | 1319 | 40 |
| 5 | 2725 | 10 | 34.77 | 0.19 | 1099 | 100 |

TABLE 7

Fluid properties and filtration in rock

| K, Pa · s$^n$ | n | Type | Leakoff coefficient, m/s$^{0.5}$ | Spurt loss coefficient, m$^3$/m$^2$ | Gel concentration, kg/m$^3$ |
|---|---|---|---|---|---|
| 0.57 | 0.81 | non-Newtonian | 3.9E−4 | 0 | 4.8 |

TABLE 8

Proppant properties

| Size (US mesh) | Average diameter, mm | Specific density | Average permeability of proppant pack, m$^2$ |
|---|---|---|---|
| 20/40 | 0.560 | 2.65 | 7.1E−11 |

TABLE 9

Pumping parameters (hydraulic fracturing schedule)

| Flow rate, m$^3$/min | Injection volume, m$^3$ | Proppant concentration, kg/m$^3$ |
|---|---|---|
| 3.5 | 103.8 | 100 |

Figure 7:
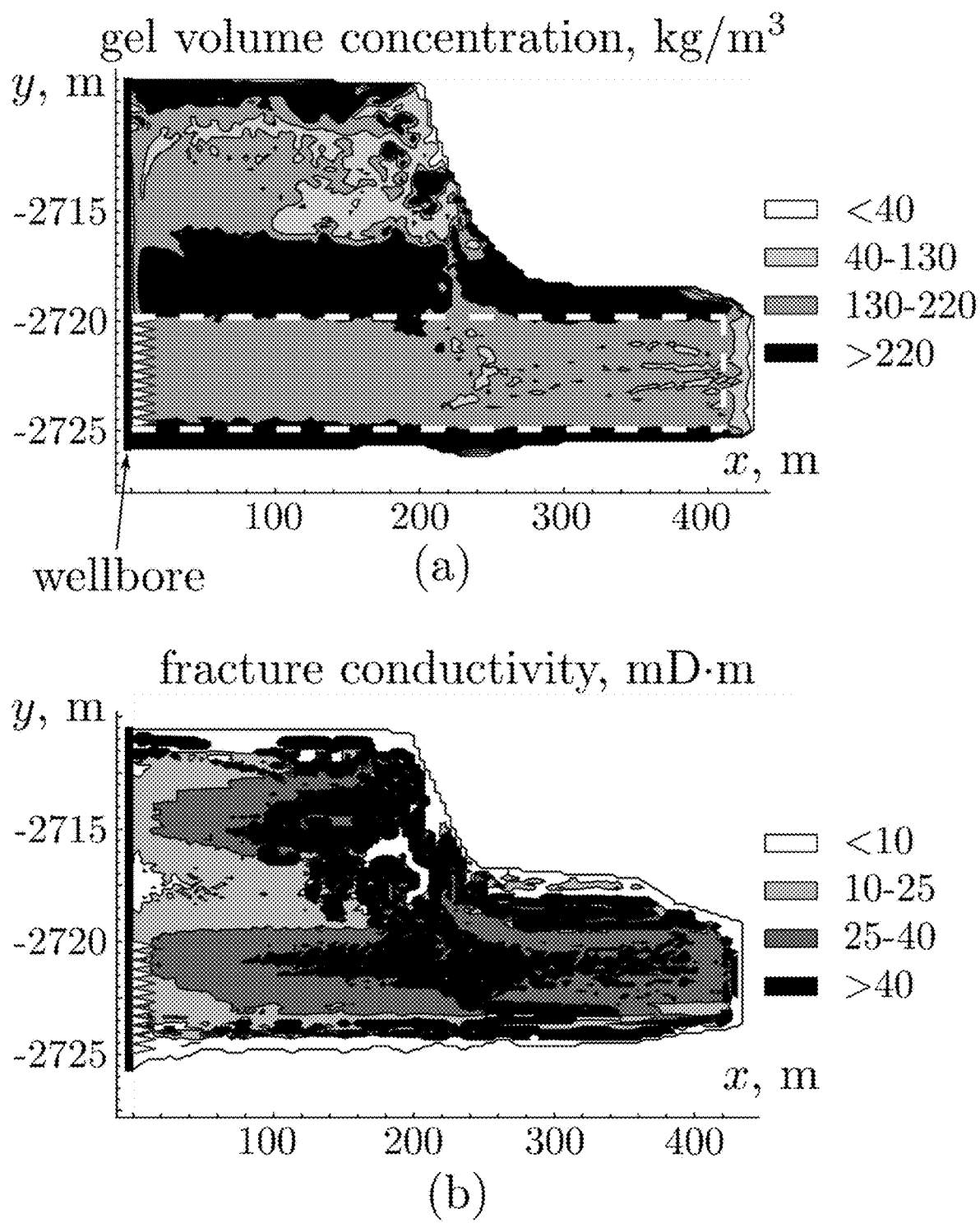
FIG. 7. Distribution of gel concentration (a) and conductivity (b) after fracture closure.

In FIG. 7, the distribution of gel concentration in the fracture after its closure is presented. The fracture is initiated in reservoir 4 near the well perforated area, and, over time, it reaches reservoir 2 through intermediate reservoir 3 with different properties.

The gel has maximum concentration in intermediate reservoir 3. This means that when the fracture is ready for the production step, the gel slug in this area will make difficult the transport of hydrocarbons from the upper part of the fracture towards the perforations, as can be seen from conductivity distribution in FIG. 7(b). The area of high conductivity in the lower part of the fracture near the perforations, marked by the rectangle in FIG. 7(a), communicates with the upper part of the fracture through a narrow conductive area, which is not sufficient for efficient transport of the oil and gas fluid produced. To optimize the design of fracturing operation, it is necessary to review the perforation strategy, for example, to perforate once more the area of the well in reservoir 2.

In the one-dimensional hydraulic fracturing material transport model, the said effect is not taken into account since the distribution of gel concentration is not calculated in the vertical plane. As a result, one cannot conclude that the oil-saturated reservoirs, intersected by the fracture, come into contact with the perforations. Therefore, the risks of loss of inflow from these reservoirs cannot be predicted.

Conclusion

The proposed method allows us to simulate the fracture contamination that takes place during the hydraulic fracturing process, and make a well-grounded decision regarding the possible methods of optimization of the schedule of hydraulic fracturing fluid injection and well completion. For example, when gel concentration is high (gel damage), the operator makes a decision to perform the additional step, fracture clean-up.

Example 4. Calculation of Hydraulic Fracturing Fluid Temperature Distribution

Case

During hydraulic fracturing, chemical additives to fluid are selected taking into account the reservoir temperature aimed to preventing the thickening polymer degradation while heating, i.e. to maintain the fluid's viscosity and carrying capabilities from the time it enters the fracture up to the moment of fracture closure. To break the carrier fluid (e.g., crosslinked gel) viscosity, the reducing agents (gel breaking agents) are added. Gel breaking agents are usually activated at a temperature exceeding the critical one for this gel, and the gel destruction is undesirable before completion of hydraulic fracturing and final placement of proppant for maximum conductivity of the fracture. Different degradable materials, used for improvement of proppant transport (and for diversion of the flow from one hydraulic fracture to another), also have temperature limits. Based on the above, prediction of the time, within which the injected fluid slugs are heated from the surface temperature (in the wellhead) to the reservoir temperature, is important during injection scheduling. Premature heating of hydraulic fracturing carrier fluid (temperature viscosity degradation) leads to the risk of proppant settling (settling of proppant at the bottom of the fracture) and reduction of fracture conductivity (incomplete propping of the fracture).

Solution

Simulation using the proposed disclosure (two coupled submodels) was performed. As an example, a situation, for which the reservoir parameters are presented in Table 10, was considered. Table 11 contains the injected fluid rheology. Note that at a temperature of 38° C. fluid viscosity is >100 cP at 170 c$^{-1}$, and when heated to 79° C. the fluid has a viscosity of 1 cP, i.e. it almost completely loses its carrying properties. The coefficient of leakoff Ct=3.9E-6 m/s$^{0.5}$. The reservoir temperature is 80° C. The fluid temperature at the surface is 27° C. Table 12 contains the proppant properties. Table 13 provides the pumping parameters (hydraulic fracturing schedule). The steps are injected into the vertical well through the perforation cluster created in the interval from 2716 m to 2746 m (true vertical depth). Initiation of the fracture occurs in reservoir No. 2 (perforation area).

TABLE 10

Reservoir mechanical properties

| Reservoir zones | Reservoir zone top depth, m | Thickness, m | Young's modulus, GPa | Poisson's ratio | Fracture toughness, kPa · m$^{1/2}$ | Closure stress, MPa |
|---|---|---|---|---|---|---|
| 1 | 2700 | 10 | 23.3 | 0.28 | 1100 | 100 |
| 2/perforations | 2710 | 30 | 34.5 | 0.18 | 1320 | 40 |
| 3 | 2750 | 10 | 34.8 | 0.19 | 1100 | 100 |

TABLE 11

Fluid properties (viscous gel rheology) at different
temperatures and exposure in the subterranean reservoir

| Exposure time, h | K, Pa · s$^n$ | n | Viscosity at a shear rate of 170 c$^{-1}$ |
|---|---|---|---|
| Temperature, 38° C. | | | |
| 0 | 0.59 | 0.68 | 115 |
| 1 | 0.52 | 0.70 | 113 |
| 2 | 0.42 | 0.75 | 112 |
| Temperature, 52° C. | | | |
| 0 | 1.10 | 0.54 | 104 |
| 1 | 0.95 | 0.56 | 100 |
| 2 | 0.77 | 0.60 | 98 |
| Temperature, 66° C. | | | |
| 0 | 1.48 | 0.49 | 108 |
| 1 | 1.15 | 0.53 | 103 |
| 2 | 0.86 | 0.58 | 100 |
| Temperature, 79° C. (> critical for gel) | | | |
| 0 (broken gel) | 1.0E−3 | 1 | 1.0E−3 |

Table 11 shows that for the temperature interval of 38-66° C. the viscous gel rheology (column 4) changes insignificantly even at the exposure of 1-2 hours (characteristic time-scale of hydraulic fracturing). At higher temperatures (>79° C.) the gel is broken (viscosity equal to water viscosity is achieved). This change in viscosity with the increase in temperature requires that the temperature factor be taken into account when making a hydraulic fracturing prediction.

TABLE 12

Proppant properties

| Size (US mesh) | Average diameter, mm | Specific density | Average permeability of proppant pack, m$^2$ |
|---|---|---|---|
| 20/40 | 0.560 | 2.65 | 8.6E−11 |

TABLE 13

Pumping parameters (hydraulic fracturing schedule)

| Step | Fluid | Flow rate, m$^3$/min | Injection volume, m$^3$ | Proppant concentration, kg/m$^3$ |
|---|---|---|---|---|
| 1 | fluid 1 | 2.0 | 30 | 0 |
| 2 | fluid 1 + proppant | 2.0 | 10 | 120 |

In this example, we examined the impact of the two-dimensional and one-dimensional models of heat transfer in the hydraulic fracture on the distribution of proppant in it. Temperature distribution affects proppant viscosity and settling rate, which in their turn, affect the final distribution of the proppant concentration and hydraulic fracture conductivity.

Figure 8:
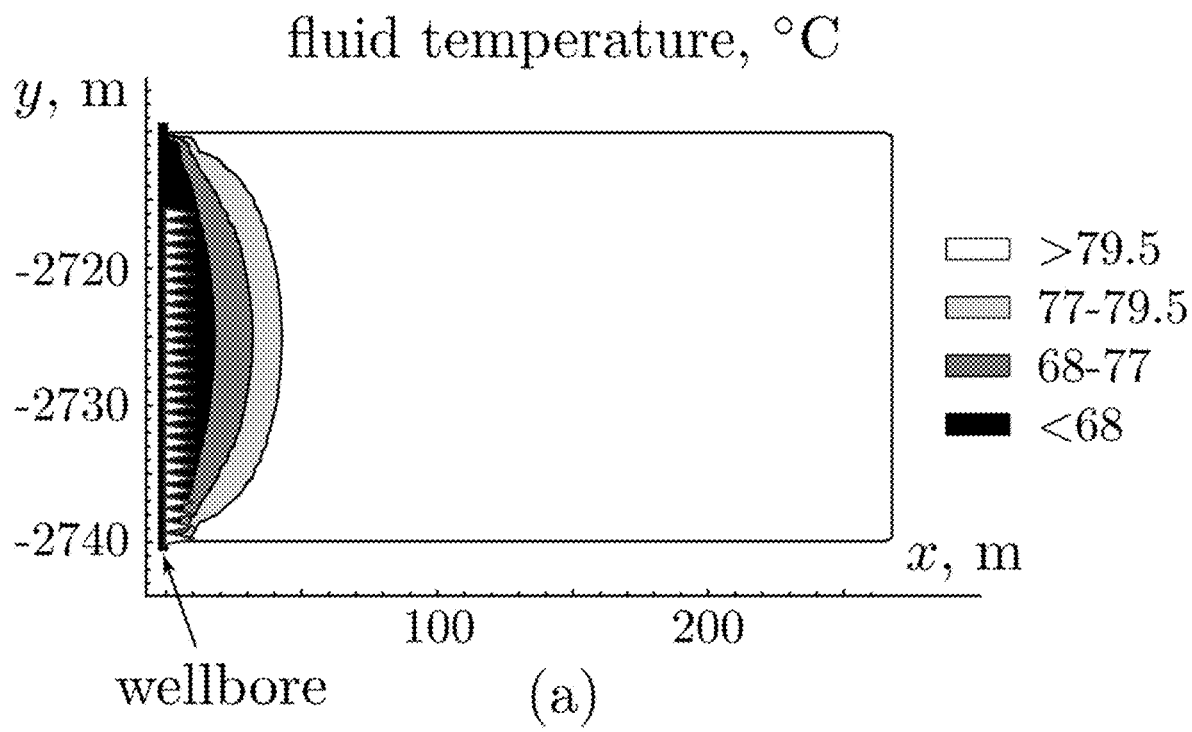
FIG. 8. Distribution of the carrier fluid temperature in the fracture when injection stopped (a) and distribution of conductivity (b). Simulation was carried out using the two-dimensional hydraulic fracturing material transport model.
Figure 8:
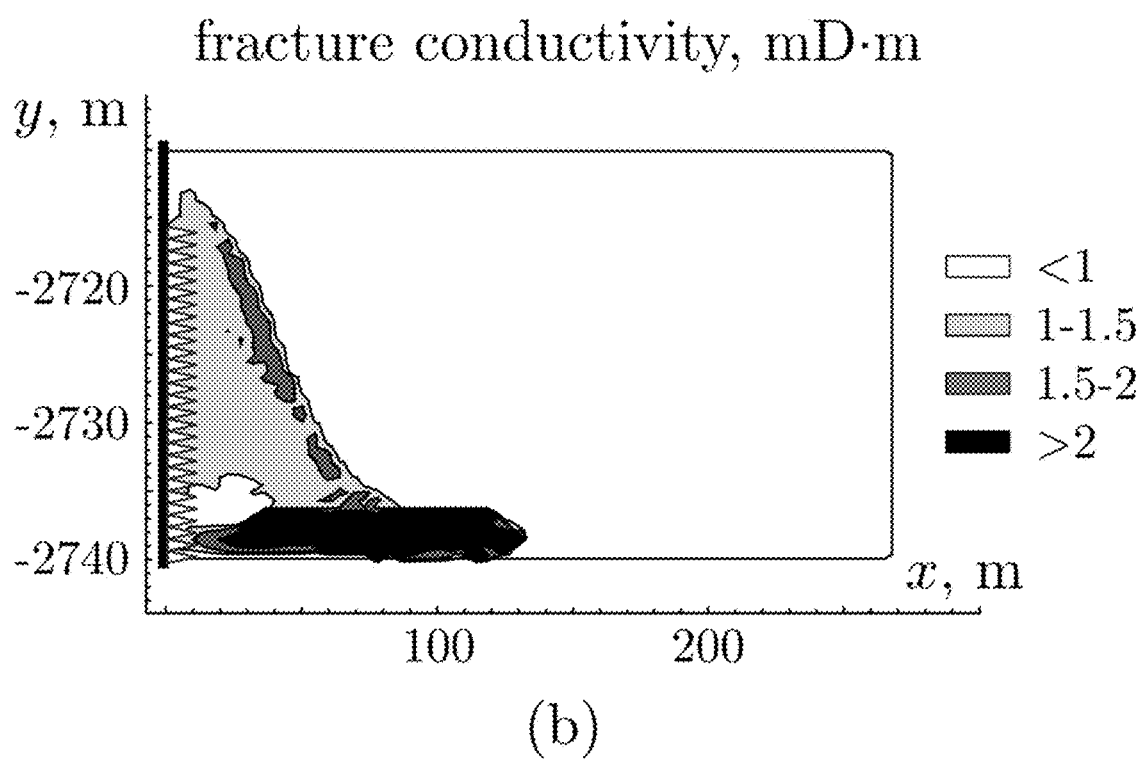
Figure 9:
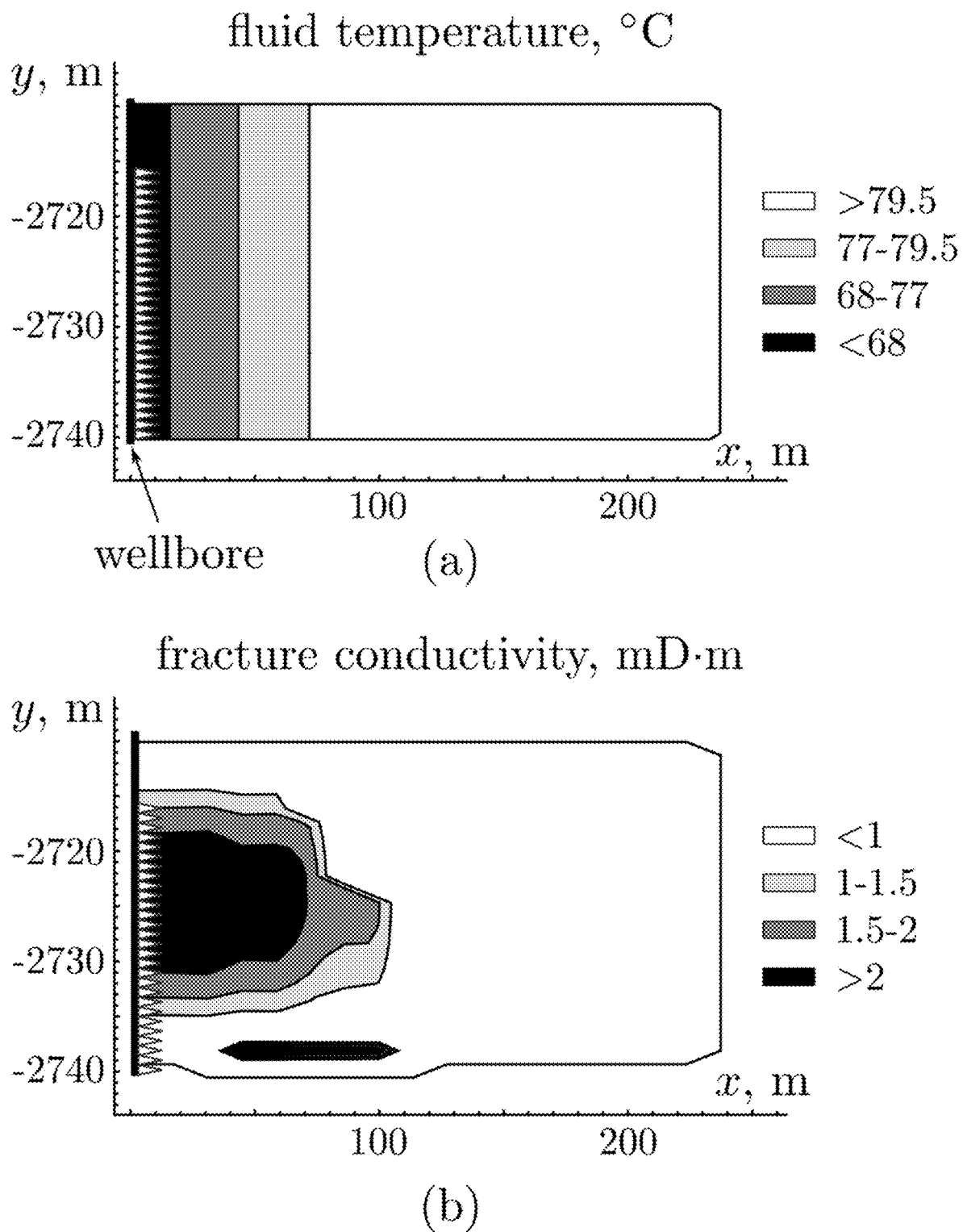
FIG. 9. Distribution of the carrier fluid temperature in the fracture when injection stopped (a) and distribution of conductivity (b). Simulation was carried out using the one-dimensional hydraulic fracturing material transport model.

FIG. 8(a) and FIG. 9(a) show the distribution of fluid temperatures in the fracture at the time of injection completion. As we can see, the shape of the area that has cooled is different for the two scenarios considered. In the one-dimensional model the fracture region consists of vertical strips with the same temperature, and in the two-dimensional model the region consists of curves. The simplified (one-dimensional) model shows that the upper and the lower ends of the fracture are in contact with the cooled fluid, while the two-dimensional model predicts heated fluid at all fracture ends. The difference in the cooled region area is accounted for by different velocity fields and leakoff volumes. The fracture propagation area, marked by the solid line, constituted 265 m in FIGS. 8(b) and 240 m in FIG. 9(b). The heights of the fractures in both models are the same since their propagation was artificially restricted by impermeable barriers.

FIG. 8(b) and FIG. 9(b) present the calculated distribution of conductivity in the fracture. In FIG. 8(b) the proppant settled mainly at the bottom of the fracture, which resulted in reduced conductivity in the central part of the fracture as compared to conductivity distribution from FIG. 9(b). This is caused by the fact that the fluid temperature in this region in FIG. 9(a) is lower than that in FIG. 8(a) and that with one-dimensional calculation, the fluid has a higher viscosity in accordance with Table 11. Prediction of temperature and fracture conductivity distribution showed the presence of risk of ineffective hydraulic fracturing.

Conclusion

The proposed disclosure allows us to simulate the impact of the two-dimensional distribution of temperature on carrier fluid rheology, account for its influence on fracture geometry, transport and settling of proppant. On the basis of these predictions, the operator can make a decision, for example, to select a type of carrier fluid corresponding to the temperatures obtained in the fracture. Hence, a hydraulic fracture with a higher average temperature will require a gelling agent accommodated to the higher temperature.

Example 5. Simulation of Proppant Bridging and Assessment of Risk of Hydraulic Fracturing Case The hydraulic fracturing technology includes injection into the well of hydraulic fracturing fluid (water soluble polymer gel, in some cases, water-based fluid with additives) at pressures exceeding the oil-bearing reservoir fracturing pressure. To keep the fracture open, proppant is used. During proppant injection partial or complete screen-out of proppant may occur. This occurs due to the fact that the proppant transported by the carrier fluid forms a plug in the perforations or inside the fracture. This invokes significant resistance to the flow of fluid and a registered sharp rise in pressure at the wellhead. The hydraulic fracture stops growing lengthwise, and reservoir stimulation operations come to a halt.

In practice, the operation design (hydraulic fracturing schedule) is developed in a way to prevent uncontrolled plugging of the fracture. To assess the risks related to bridging during hydraulic fracturing, it is necessary to predict the placement of proppant in the fracture with high accuracy. Two-dimensional simulation of hydraulic fracturing material transport allows us to predict the proppant placement, while the one-dimensional approach can lead to significant errors and incorrect risk assessment.

Solution

Simulations were made using the proposed disclosure. As an example, the fracture propagating in the reservoirs, which are described in Table 14, was considered. Initiation occurs in zone 6. The pumping parameters and fluid properties are presented in Tables 15, 16, 17. Hydraulic fracturing fluid is injected into the vertical well through 3 perforation intervals (true vertical depth): 1) from 3430 m to 3437 m; 2) from 3439 m to 3446 m; 3) from 3449 m to 3460 m.

TABLE 14

Mechanical properties of reservoir zones and position of a perforation cluster

| Reservoir zones | Reservoir zone top depth, m | Thickness, m | Young's modulus, MPa | Poisson's ratio | Fracture toughness $K_{IC}$, $kPa \cdot m^{1/2}$ | Closure stress, MPa |
|---|---|---|---|---|---|---|
| 1 | 3413.7 | 2.6 | 52 | 0.23 | 1319 | 80 |
| 2 | 3416.3 | 5.2 | 49 | 0.19 | 1319 | 75 |
| 3 | 3421.5 | 2.6 | 49 | 0.17 | 1319 | 75 |
| 4 | 3424.0 | 4.0 | 45 | 0.15 | 1319 | 75 |
| 5 | 3428.0 | 2.0 | 51 | 0.22 | 1319 | 75 |
| 6/perforations | 3430.0 | 3.1 | 54 | 0.22 | 1319 | 75 |
| 7/perforations | 3433.1 | 3.2 | 54 | 0.22 | 1319 | 75 |
| 8/perforations | 3436.2 | 5.1 | 56 | 0.22 | 1319 | 75 |
| 9/perforations | 3441.4 | 3.6 | 55 | 0.22 | 1319 | 75 |
| 10/perforations | 3445.0 | 2.5 | 55 | 0.22 | 1319 | 75 |
| 11/perforations | 3447.5 | 3.0 | 60 | 0.22 | 1319 | 74 |
| 12/perforations | 3450.5 | 2.5 | 58 | 0.22 | 1319 | 75 |
| 13/perforations | 3453.0 | 3.7 | 57 | 0.22 | 1319 | 75 |
| 14/perforations | 3456.7 | 3.3 | 53 | 0.22 | 1319 | 75 |
| 15 | 3460.1 | 2.4 | 56 | 0.22 | 1319 | 75 |
| 16 | 3462.5 | 4.0 | 54 | 0.22 | 1319 | 100 |

TABLE 15

Fluid properties

| Fluid | K, $Pa \cdot s^n$ | n | Rheology type | Leakoff coefficient, $m/s^{0.5}$ | Spurt loss coefficient, $m^3/m^2$ |
|---|---|---|---|---|---|
| fluid 1 | 22.6 | 0.16 | non-Newtonian | 1.1E−4 | 0 |

TABLE 16

Proppant properties

| Size (US mesh) | Average diameter, mm | Specific density | Average permeability of proppant pack, $m^2$ |
|---|---|---|---|
| 20/40 | 0.675 | 3.62 | 1.6E−10 |

TABLE 17

Pumping parameters (hydraulic fracturing schedule as per steps with an increase in proppant concentration)

| Step | Fluid | Flow rate, $m^3$/min | Injection volume, $m^3$ | Proppant concentration, kg/$m^3$ |
|---|---|---|---|---|
| 1 | fluid 1 (gel) | 4 | 75.7 | 0.0 |
| 2 | fluid 1 + proppant | 4 | 15.1 | 120 |
| 3 | fluid 1 + proppant | 4 | 15.1 | 240 |
| 4 | fluid 1 + proppant | 4 | 15.1 | 360 |
| 5 | fluid 1 + proppant | 4 | 15.1 | 480 |
| 6 | fluid 1 + proppant | 4 | 15.1 | 600 |
| 7 | fluid 1 + proppant | 4 | 15.1 | 720 |
| 8 | fluid 1 + proppant | 4 | 15.1 | 840 |
| 9 | fluid 1 + proppant | 4 | 17 | 960 |

Figure 10:
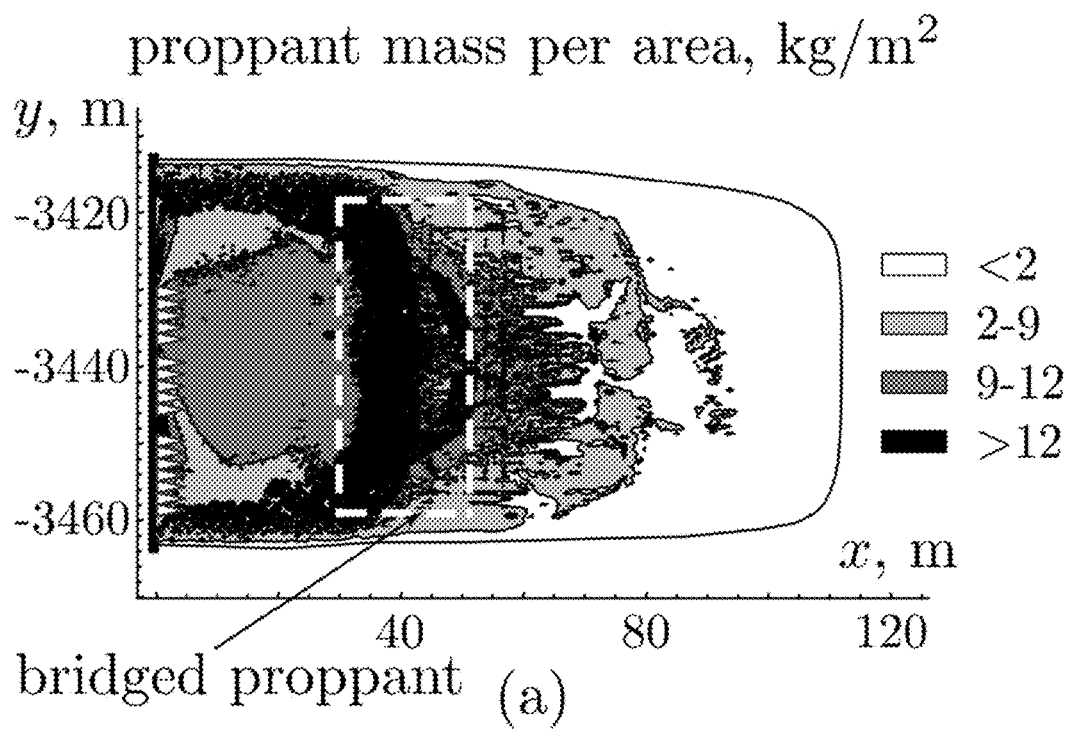
FIG. 10. Simulation of proppant bridging in the narrow fracture using the two-dimensional fracture growth submodel: proppant concentration (a) and fracture conductivity (b).
Figure 10:
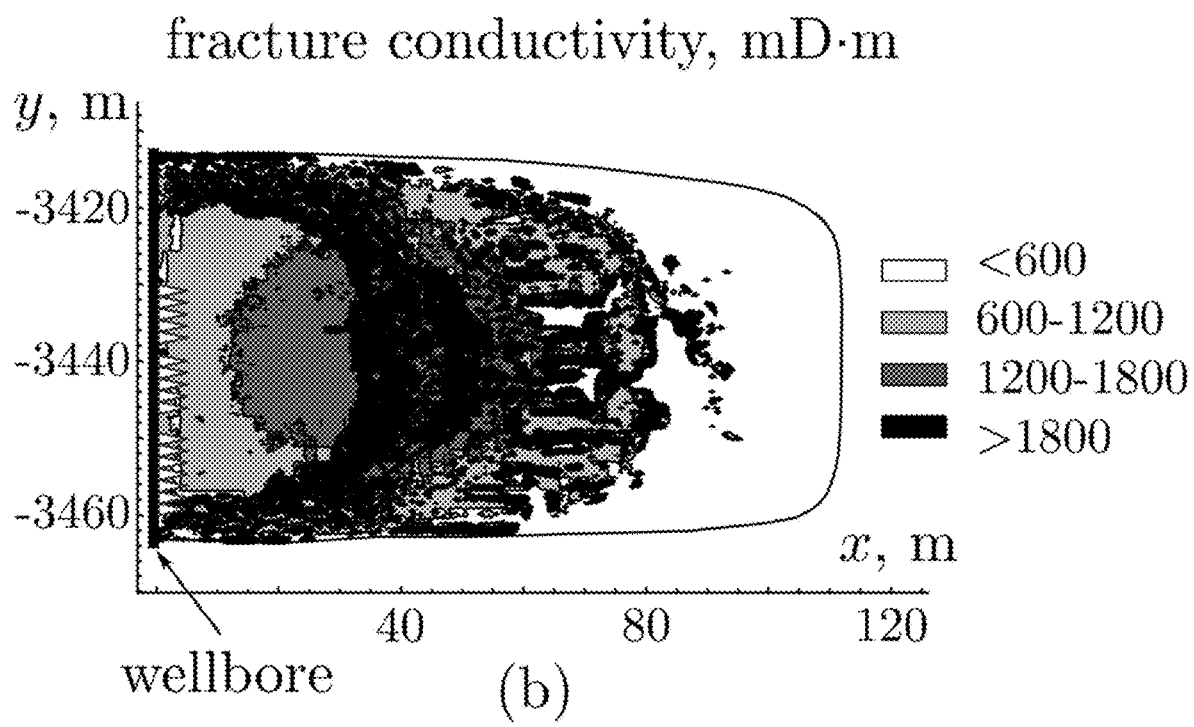
Figure 11:
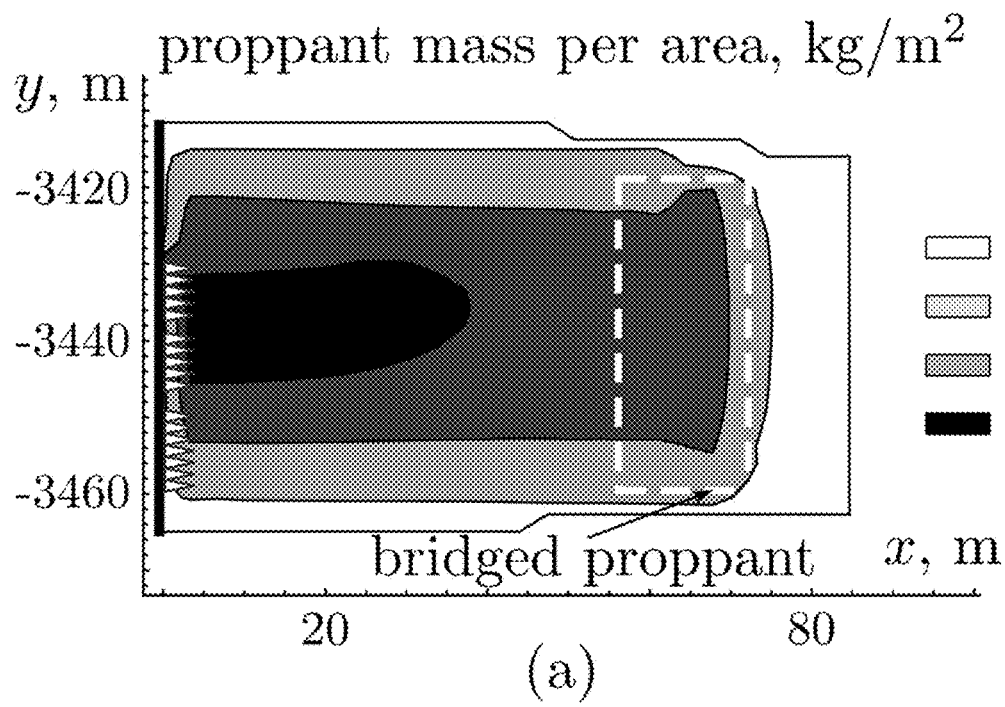
FIG. 11. Simulation of proppant bridging in the narrow fracture using the one-dimensional fracture growth submodel: proppant concentration (a) and fracture conductivity (b).
Figure 11:
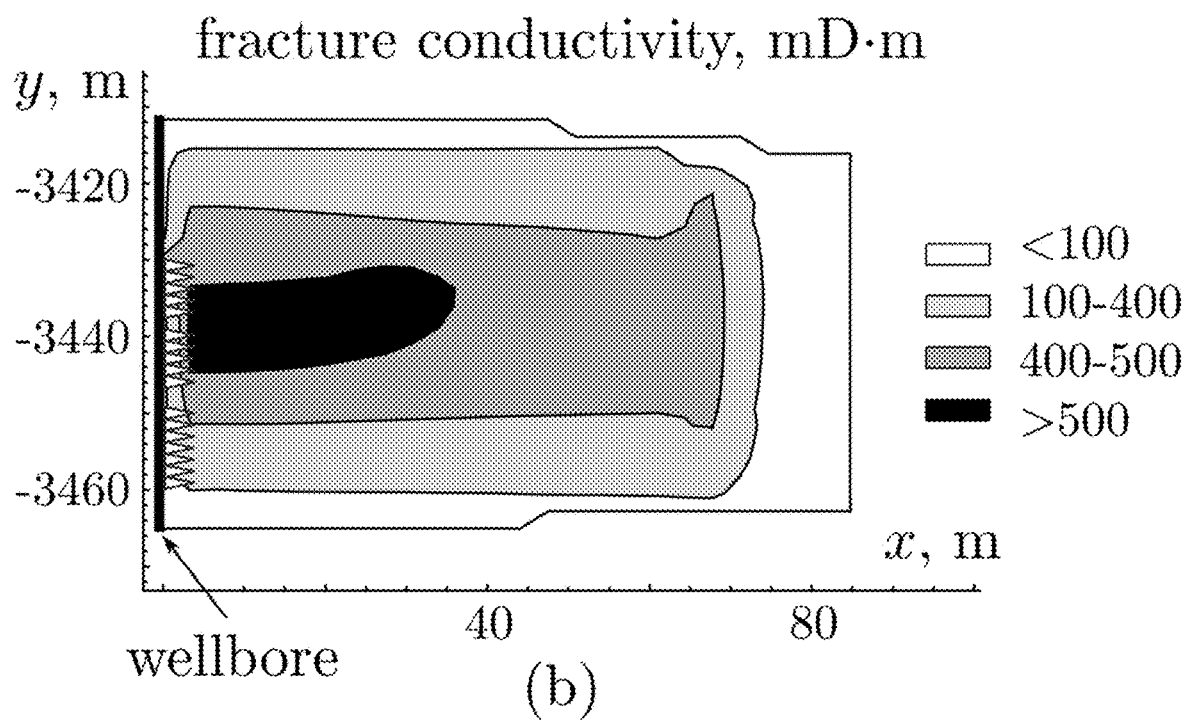

FIG. 10 and FIG. 11 show the distributions of the proppant concentration in the fracture at the end of job time for the one-dimensional and two-dimensional approaches to hydraulic fracturing material transport simulation. In the one-dimensional model, proppant bridging occurred at a distance of 75 m from the wellbore after injecting 7 $m^3$ of fluid at the 4th step of the schedule. The main reason for this effect is that for the one-dimensional transport submodel, the bridging in one cell completely stops fracture growth lengthwise. In the example presented, the final length of the fracture is equal to 84 m (FIG. 11).

Coupling of the two-dimensional transport model with the pseudo-three-dimensional fracture propagation model allows us to calculate, with a high resolution, the placement of the proppant, with bridging in local areas taken into account. FIG. 10 shows the local bridging area (marked with a white dashed line) in the interval along axis x from 30 m to 50 m. In this case, the fracture continues to grow and fill up with slurry due to heterogeneous proppant distribution. In the example presented the final length of the fracture is equal to 115 m (FIG. 10 (b)).

Conclusion

The proposed disclosure allows to realistically simulate the flow of slurry around the areas where proppant bridging occurred, which has a significant impact on fracture geometry and proppant transport as a whole. When using the one-dimensional hydraulic fracturing material transport submodel (prior art), a prediction of hydraulic fracturing, in which the fracture length is smaller than that with the use of the two-dimensional submodel, is obtained. On the basis of two-dimensional calculation of material transport, the operator makes a well-grounded decision, for example, to select a proppant concentration or a slurry injection rate aimed at reducing bridging inside the fracture.

It is apparent that the above embodiments shall not be regarded as a limitation of scope of these patent claims. It is clear for a person skilled in the art that it is possible to introduce many changes to the methods described above without departing from the principles of the claimed disclosure.

The invention claimed is:

1. A method of hydraulic fracturing in a reservoir, the method comprising:
   inputting data for a hydraulic fracturing schedule;
   inputting data for a submodel of hydraulic fracture propagation in the reservoir, wherein the submodel of propagation of hydraulic fracture propagation is a pseudo-3D model;
   inputting data for a submodel of transport of hydraulic fracturing materials in a fracture, wherein the submodel of transport of hydraulic fracturing materials is a 2D model with higher space and time resolution than the pseudo-3D model, wherein the hydraulic fracturing materials include propping agents, fibers and additives;

simulating hydraulic fracturing using the submodel of propagation of hydraulic fracturing and the submodel of transport of hydraulic fracturing material, wherein a coupling of the submodels is carried out as per hydrodynamic resistance for simulation cells; and outputting simulation data addressing the time of completion of the hydraulic fracturing schedule, or the time of fracture closure.

2. The method of claim 1, further comprising: performing hydraulic fracturing on the basis of the hydraulic fracturing schedule.

3. The method of claim 1, wherein the hydraulic fracturing schedule data comprises proppant concentration data, fibers and additives concentration data, and hydraulic fracturing fluid properties data.

4. The method of claim 1, wherein the submodel of propagation of hydraulic fracturing comprises equilibrium equations of pressure and stress on fracture walls.

5. The method of claim 1, wherein the submodel of transport of hydraulic fracturing material comprises mass balance equations for hydraulic fracturing fluid, proppant, fibers and additives, and pulse and energy balance equations.

6. The method of claim 1, wherein outputting simulation data comprises outputting simulation data of proppant concentration distribution, fracture conductivity, hydraulic fracturing fluid temperature at the time of completion of the hydraulic fracturing schedule, or fracture closure, or a combination thereof.

7. The method of claim 1, comprising: obtaining a prediction of well productivity after performing hydraulic fracturing based on the simulation data.

8. The method of claim 1, wherein inputting data for a hydraulic fracturing schedule comprises inputting data defining a sequential injection of pulses of clean fluid and proppant-laden fluid; obtaining hydraulic fracture conductivity data; and performing hydraulic fracturing based on the hydraulic fracture conductivity data.

9. The method of claim 1, comprising: obtaining data for areas in the predicted hydraulic fracture, adjusting the hydraulic fracturing schedule based on the simulation data and the data obtained for areas in the predicted hydraulic fracture.

10. The method of claim 9, wherein the areas in the predicted hydraulic fracture have low hydraulic conductivity near a perforation resulting in overflush.

11. The method of claim 9, wherein the hydraulic fracturing schedule is adjusted to minimize fracture contamination and ensure a desired increase in well productivity.

12. The method of claim 9, wherein the areas in the predicted hydraulic fracture have low conductivity in a hydraulic fracture resulting in fracture plugging.

* * * * *